US011620111B2

(12) United States Patent
Hicklin et al.

(10) Patent No.: US 11,620,111 B2
(45) Date of Patent: Apr. 4, 2023

(54) PROVIDING SERVICES FOR ASSISTING PROGRAMMING

(71) Applicant: The MathWorks, Inc., Natick, MA (US)

(72) Inventors: Joseph F. Hicklin, Wayland, MA (US); Claudia G. Wey, Wayland, MA (US); John W. Glass, Weston, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 16/828,720

(22) Filed: Mar. 24, 2020

(65) Prior Publication Data

US 2021/0303271 A1 Sep. 30, 2021
US 2022/0137934 A9 May 5, 2022

(51) Int. Cl.
*G06F 8/33* (2018.01)
(52) U.S. Cl.
CPC ...................... *G06F 8/33* (2013.01)
(58) Field of Classification Search
CPC ........................................................ G06F 8/33
See application file for complete search history.

(56) References Cited

U.S. PATENT DOCUMENTS

| | | | | |
|---|---|---|---|---|
| 7,593,603 | B1 * | 9/2009 | Wilensky | G06T 5/00 382/311 |
| 8,250,527 | B1 * | 8/2012 | Gubbay | G06F 8/33 717/113 |
| 9,053,235 | B1 * | 6/2015 | Bienkowski | G06F 3/0484 |
| 9,262,180 | B2 * | 2/2016 | Menon | G06F 9/453 |
| 10,055,205 | B2 * | 8/2018 | Di Balsamo | G06F 8/36 |
| 10,222,944 | B1 | 3/2019 | Hicklin et al. | |
| 10,223,076 | B1 | 3/2019 | Owen et al. | |
| 10,719,301 | B1 * | 7/2020 | Dasgupta | G06F 8/33 |
| 10,949,171 | B1 * | 3/2021 | Chiluvuri | G06F 8/73 |
| 2007/0044066 | A1 * | 2/2007 | Meijer | G06F 8/33 717/100 |
| 2010/0050154 | A1 * | 2/2010 | Balasubramanian | G06F 8/33 717/113 |

(Continued)

OTHER PUBLICATIONS

Svyatkovskiy, Alexey, et al. "Pythia: Ai-assisted code completion system." Aug. 4, 2019. Proceedings of the 25th ACM SIGKDD International Conference on Knowledge Discovery & Data Mining. (Year: 2019).*

*Primary Examiner* — Duy Khuong T Nguyen
(74) *Attorney, Agent, or Firm* — Wolf, Greenfield & Sacks, P.C.

(57) ABSTRACT

Systems and methods for services for assisting programming are disclosed. The systems and methods can be used to, during edit time, for program code or data of interest, identify one or more services available to the program code or the data of interest, generating a context for the one or more services, execute code for the one or more services within the context to generate a result for each of the one or more services, analyze the result for each of the one or more services to select a subset of results based on criteria associated with the program code, the data of interest, or the one or more services, and offer, to a user, services corresponding to the subset of results or the subset of results as suggestions to facilitate further development of the program code or use of the data of interest.

27 Claims, 14 Drawing Sheets

(56) References Cited

U.S. PATENT DOCUMENTS

| | | | |
|---|---|---|---|
| 2013/0024844 A1* | 1/2013 | Bienkowski | G06F 11/3688 717/125 |
| 2014/0359572 A1* | 12/2014 | Yuen | G06F 8/33 717/111 |
| 2015/0089471 A1* | 3/2015 | Chen | G06F 16/9535 717/110 |
| 2015/0277860 A1* | 10/2015 | Hur | G06F 8/36 717/110 |
| 2016/0103662 A1* | 4/2016 | Di Balsamo | G06F 8/36 717/107 |
| 2019/0243617 A1* | 8/2019 | Stevens | G06F 8/42 |
| 2019/0243622 A1* | 8/2019 | Allamanis | G06F 11/3604 |
| 2019/0332968 A1* | 10/2019 | Fu | G06N 7/005 |
| 2019/0384581 A1* | 12/2019 | Liu | G06F 8/36 |
| 2020/0293617 A1* | 9/2020 | Luo | G06F 8/73 |

* cited by examiner

PROVIDING SERVICES FOR ASSISTING PROGRAMMING

BRIEF DESCRIPTION OF THE DRAWINGS

The skilled artisan will understand that the figures, described herein, are for illustration purposes only. It is to be understood that in some instances various aspects of the invention may be shown exaggerated or enlarged to facilitate an understanding of the invention. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

Figure 1:
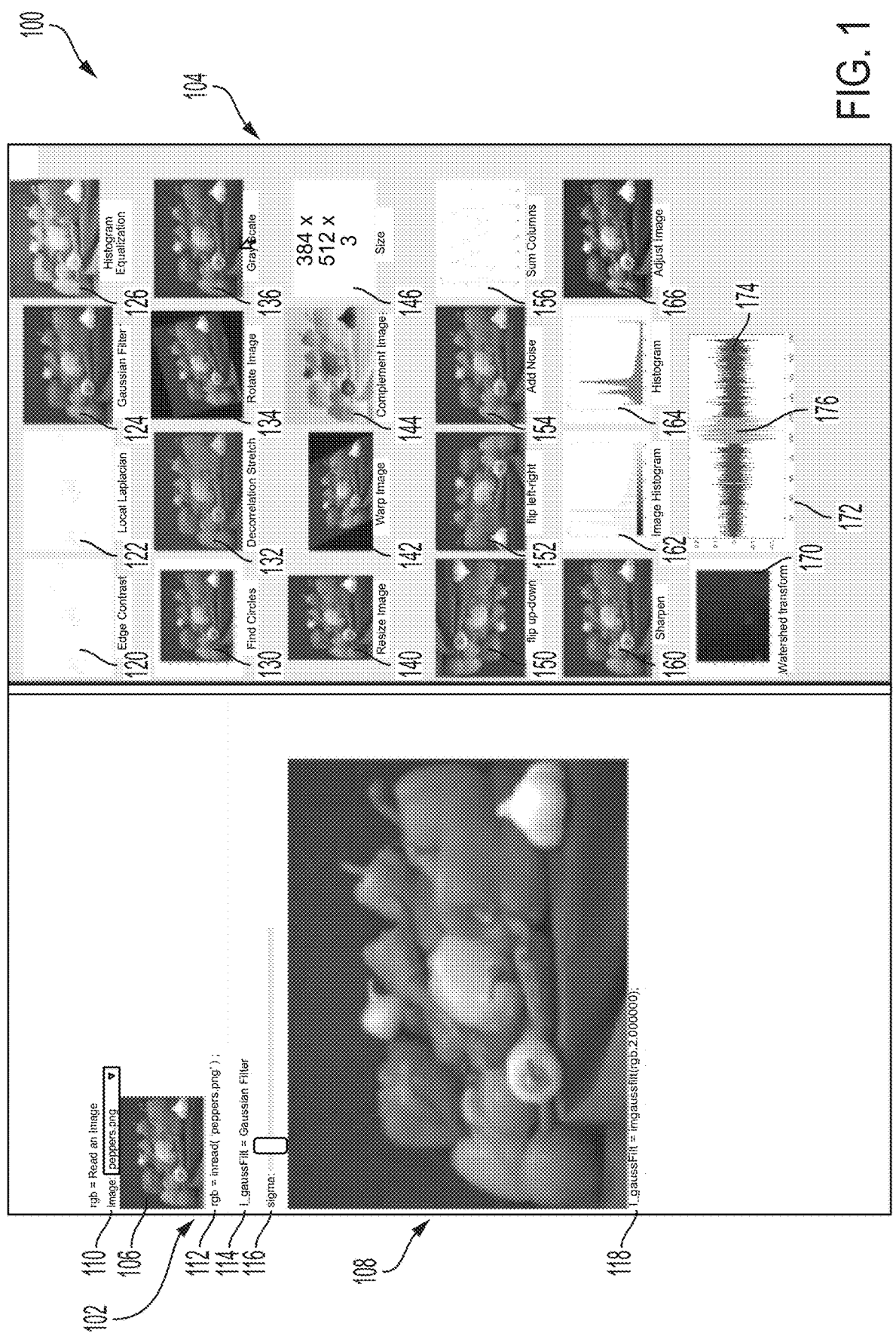
FIG. 1 depicts an exemplary interface for an editor where services are provided for assisting programming.

The features and advantages of the present invention will become more apparent from the detailed description set forth below when taken in conjunction with the drawings.

DETAILED DESCRIPTION

The following detailed description refers to the accompanying drawings. The same reference numbers in different drawings may identify the same or similar elements.

In computer programming, a processor can perform a functionality, e.g., carrying out calculations or generating plots, when program code is executed. The program code can be handwritten by a user (e.g., by a computer programmer) in an editor or command window of a programming environment. However, writing and/or editing code can be difficult, time consuming, and error prone for the user. In some cases, users do not have all the knowledge they may need to effectively use one or more functions in their code. For example, users who do not have the same knowledge as an author of a particular function or another expert may be unable to effectively use the function. In some implementations, a function is a named section of a program that performs a specific task or provides desired functionalities. A function can be a type of procedure or routine. In some implementations, a function includes one or more arguments, one of more of which being input arguments and one or more of which being output arguments. In other situations, a function may not include any inputs or outputs.

The inventors have appreciated that an author of a function typically has expertise beyond the algorithmic implementation of the function. For example, the author of the function may understand when the function should be used, and what its assumptions, constraints, and limitations are. Further, the author may understand how to display, interpret, and evaluate results from the function. However, end users often do not have this expertise needed for effectively using the function. The systems and methods described herein provide for one or more services for delivering the function author's expertise to end users of a suitable programming language development environment, thereby allowing the users to use the function as if they were the author or an expert user of the function. The services can be provided by encoding the services in code generated by the author, another person, e.g., an expert, who is familiar with the function, or automatically by a model, e.g., a trained AI model, and executing the code. The services can be provided when its corresponding function(s) are programmed or edited.

Additionally or alternatively, the services may be provided when a file or data is added to a workspace, a folder, or another suitable aspect of a programming language development environment. For example, a trigger for providing the services can be a workspace change or a current folder change in the programming language development environment. The inventors have appreciated that, unlike conventional approaches, the systems and methods described herein can provide for one or more services that can analyze the added file or data. In conventional approaches, such as those based on machine learning methodologies, while static code may be available, data is typically not available for analysis. Moreover, conventional approaches typically look for patterns in code only at a global level. The described systems and methods can advantageously analyze both code and data to determine, e.g., whether a particular function in the code is relevant to the data.

Providing the services may involve determining when to provide the services, locating the related code implementing the services, obtaining data necessary for providing the services, executing the code, analyzing results of the execution, and/or providing selected results to the user who programmed or edited the function(s). While the information provided to the user is visible while the user is editing code in the editor or command window, the work to find, choose, run, analyze and/or prepare/generate code and/or data can be conducted without any user input. In some implementations, as a user enters program code in the editor, without needing the user to instruct the system to execute the entered program code, the program code is evaluated, e.g., executed, and data from the execution is made available for later execution, e.g., as the user inputs more program code, or for providing services to the user to assist with inputting more program code. In some embodiments, user preferences (e.g., one or more settings specified by the user, such as preferred field(s), types of functions, etc.) or user information (e.g., history of functions and/or data used, related field(s), biographical information, etc.) may be used as a factor for providing services to the user to assist with inputting more program code.

In some implementations, various types of the services can be provided. Example services can include: examining the inputs to a function to determine whether there are any issues, e.g., conformance issues, with the inputs that need to be addressed or there are alternative functions or parameter combinations for the function that are suitable for the inputs; examining the outputs of a function to determine whether the function is useful or there are alternative parameters for the function to improve the outputs; displaying outputs or the steps the function has taken to obtain the outputs; examining the program steps taken external to the function to recommend changes to the function (e.g., alternative functions or alternative parameters for the function); examining the amount of time/memory the operations have taken and provide advice on how to reduce the time/memory consumption; searching repositories of code, e.g., local repositories or online repositories, for uses of the same function or uses of similar functions and provide information about those uses; speculatively executing the function over a range of parameters and creating the results for displaying; and providing suggestions to users on whether to performing/obtaining any of the services above.

This program code that the user enters, e.g., a function call, can be referred to as "user program code." The implementation code for the functions being used or called may be referred to as "program source code." The program code implementing the services can be in the same programming language as, or can be different from, the program code being input in the editor. This program code for providing the services can be referred to as "service implementation code." In some implementations, the program environment in which the editor and the program code are can run on a thread or processor different from the code implementing the services. Providing the services does not interfere with the thread on which editor and its functionalities is run. In some implementations, multiple threads can be used to run the service implementation, e.g., in a parallel manner, to provide the services quickly so that the services can be provided to the user in a timely manner.

In some implementations, as a user adds a file or data to a workspace, without needing the user to instruct the system to evaluate the file or data, the file or data is evaluated, and information from the evaluation is made available for later use, or for providing services to the user to assist with the file or data that was added to the workspace. The current workspace may have data that can be examined and one or more services can be provided based on the analysis. For example, if a folder in the workspace contains a file that has many images, it may be expected that the next step a user will perform is image processing. One or more services can perform speculative execution to evaluate the images and the information can be stored for later use and/or provided to other services to perform further speculative tasks on the images.

In some aspects, the systems and methods described herein provide for one or more services that the editor or command window of the programming environment can apply to the user's code and provide meaningful analysis on the current code for presentation to the user. For example, it may be valuable to the user to receive suggestions on appropriate parameters or input formatting for a function entered in user program code from tentatively executed results from the function derived in the background, e.g., while the user is editing code. In another example, the user may find it helpful to receive suggested functions and/or results for data of interest. As such, a service for assisting programming may provide to the user an additional body of knowledge about a function, separate from the function's runtime implementation. Providing this knowledge for one or more functions to the user may help them use the function more effectively. Because the service separates knowledge about a function from implementation of the function itself, the described systems and methods provide a means to deliver this knowledge to the user during edit time, and therefore outside of the runtime context of the function itself.

For example, the one or more services may allow suggesting functions that are expected to be called with output data produced by execution of the program code previously input by the user or data available and of interest. For example, results may be analyzed and filtered, e.g., based on criteria. Based on the data that is available, suggested functions can be dynamically executed and the results can be filtered/presented to the user. In another example, the one or more services may suggest when another algorithm or function is appropriate to use by identifying algorithmic or functional alternatives to at least a part of the program code that can achieve the user's goals. In yet another example, the one or more services may help the user correctly prepare function inputs by analyzing inputs to a function of the program code for conformance to requirements of the function. In yet another example, the one or more services may help the user choose function parameters by identifying adjustment for the parameters to produce a desirable result from using the current parameters. In yet another example, the one or more services may evaluate usefulness of user's program code to identify whether or not the user's program code achieved the user's goal. In yet another example, the one or more services may help the user understand function results by generating one or more visualizations. This list of potential services is exemplary and the systems and methods described herein may include these and/or other suitable services and are not limited in this regard. Some details or examples of these services are described further below.

The terms "code," "program," "program code," and/or "programming code," as used herein, are to be used interchangeably and are to be broadly interpreted to include textual code, graphical code, or a combination of textual and graphical code. Textual code can include text-based code that may require further processing to execute (e.g., Ada, Basic, JAVA, C, C++, C #, FORTRAN, Python, Julia, or assembly language code; Hardware Description Language (HDL) code, very-high-speed integrated circuits (VHSIC) HDL(VHDL) code, VERILOG, System C and/or other types of hardware or software based code that may be compiled and/or synthesized); binary code that may be executed (e.g., executable files that may directly be executed by an operating system, bitstream files that can be used to configure a field-programmable gate array (FPGA), JAVA byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, textual code may include different combinations of the above-identified classes (e.g., text-based code, binary code, text files, etc.). Alternatively, or additionally, textual code may include code in a programming language that supports dynamic typing (e.g., the M language, a MAT- LAB® language, a MATLAB-compatible language, a MATLAB-like language, Julia, etc.) that can be used to express problems and/or solutions in mathematical notations. Graphical code may include models built connecting graphical blocks, where each block may represent an object associated with functionality and/or data. Blocks may be hierarchical in the sense that each block itself may be implemented as one or more blocks. A user may, for instance, view the model at a high level, then select blocks to drill down into the model to see increasing levels of model detail. Graphical code may be directly converted into textual code executable in a target environment. For example, graphical code can include a model of a control system for an automobile, which may be implemented in textual code deployed in an embedded system in the automobile. Environments for generating exemplary graphical code include Simulink®, Stateflow®, SimEvents™, etc., by The MathWorks, Inc.; VisSim by Visual Solutions: LabView® by National Instruments; Dymola by Dynasim: SoftWIRE by Measurement Computing: WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence: Rational Rose from IBM; Rhopsody or Tau from Telelogic; Ptolemy from the University of California at Berkeley; Agilent VEE by Agilent Technologies; Advanced Design System (ADS) by Agilent Technologies; Agilent Ptolemy by Agilent Technologies; SCADE Suite by Ansys; ASCET, CoWare, or aspects of a Unified Modeling Language (UML) or SysML environment.

Overview

In some aspects, the systems and methods described herein provide for one or more services that the editor or command window of the programming environment can apply to the user's code and provide meaningful analysis on the code for presentation to the user. In some embodiments, the system receives information about the user's focus of interest when the user inputs, edits, runs, or selects code or data. The user's interest may be derived or may be directly indicated by the user's input. The data of interest may be data that a user has created or used recently or uses frequently, or data is typically used in program contexts similar to the program context the user program or data is in. A program context can include code prior to the function, data or code available, the functionality (e.g., processing data) a user wants to achieve, or historical context of the code, etc. The data can be in workspace of a programming environment, on disk, at a webservice, or at a different location. The data can be of any type, e.g., numerical or other types. Data can become of interest when such data is available to the systems or methods of the disclosure, or the data is identified by a user to be of interest. In an example, the data of interest can be an output of certain program code that has been input during edit time within the editor or command window. The code of interest can be a function that a user has worked on recently or uses frequently, or that other users typically use in a similar circumstance or program context. In some examples, the code of interest can be a function that the user is programming. Even though execution of code implementing the services is conducted in the background relative to the editor or command window, this aspect of the system is considered to be during the edit time as the user does not intend to or explicitly take any intentional action to initiate code execution. Instead, the user is typically still viewing code or inputting additional code in the editor or command window. Additionally or alternatively, the edit time may include the user interacting with other aspects of the programming environment, including workspaces, folders, apps, etc. The described execution of code implementing the services is not triggered by the user, but instead is a functionality of the editor or command window for evaluation of the code and/or data of interest. Other triggers for execution of code implementing the services may include a blank line (e.g., after the user hits the "Enter" key), a change of workspace/directory, a pause in input from the user (e.g., the user stopped typing), and/or an error in execution of the code (e.g., an error when a user explicitly requests execution of the code). To support this functionality, the system may make available output results, e.g., data evaluated (e.g., when it is used as an input to a function) or used by the service implementation code, from the execution for further evaluation/analysis that can help with user programming. In some implementations, to evaluate the available data (e.g., as parameters of or inputs to a function), the system may trace the available data back to the program code that generated the data and provide suggestions based on the traced program code and/or intended usages of the available data for further handling or processing of the data based on its data type and/or format (e.g., image, table, vector, etc.) for its intended or desired usage. It is noted that editing of the code, or user interaction with other aspects of the programming environment, and running the code on explicit instruction from the user can be interweaved. For example, a user may edit or add code, request execution of the code, edit or add additional code, again request execution of the code, and so on.

In some embodiments, the system provides the user with suggestions for changes or additions that may be suitable to make in the user program code. For example, these suggestions may be in the form of offers to insert or modify code, optionally accompanied with explanations as to why the modifications might be desirable. Some of the explanations can be graphical presentations, e.g., plots, of the different results based on with or without the modifications. In another example, these suggestions may be in the form of visualizations or indications that a data type is valid or not, an input is valid or not, and/or another suitable true or false evaluation of the user program code. To generate these suggestions, the system may execute one or more services in a service context, e.g., in a thread different from the thread being used for the editor or command window. For example, the one or more services may be executed without disturbing the current code in the editor or command window. Because the one or more services are executed in a separate thread, there may be no delays or changes that occur to the current code in the editor or command window while the user continues to view and/or edit the program code. In one example, the results of the one or more services may be filtered based on statistical analysis/relative occurrence rate or relevance in connection with the program code being analyzed. This occurrence rate may be pre-calculated for particular functions before user program code is entered by the user in the editor. Additionally or alternatively, user history relating to use of particular functions may be used to compute a new, customized occurrence rate for those functions.

In some embodiments, the system identifies a set of services related to a function being focused on in the program code. Each of these services may provide a different service related to the user program code. FIG. 1 depicts an exemplary interface 100 for an editor where services are provided for assisting programming. In this example, a user may enter into the editor or command window user program code to access and read in an image 106, import the image (not shown), or grab the image from right panel 104. Other available images for grabbing may be made available and switchable through the dropdown menu 110 in the left panel 102. Code 112 is auto generated after the image is grabbed, i.e., "rgb=inread ('peppers,png')." Image data is made available for use in assisting programming. This is different from available tools in which only the code itself is made available. Based on the data, service implementation code is identified, which calls related functions (e.g., the list of functions shown in the right panel 104, and more) and executes the functions with the image 106, filters results based on relevancy or usefulness, and presents the graphical list of related functions in the right panel 104. The user can drag and drop or otherwise select the desired function, e.g., Gaussian Filter, which is shown on line 114 after the selection. Live slider 116 is created for adjusting sigma for function imgaussifilt's parameter, shown in line 118. The selected function result is made available as image 108.

In a service context separate from the program context for the editor or command window, the system may execute a service for assisting programming in the background to provide a list of related functions in the right panel 104 that may be called with the data, e.g., image 108, produced by the user program code. Each of these related functions may be executed, its output evaluated for usefulness and correctness, and the results and/or steps taken to render the results presented to the user, e.g., rendered graphically in a suitable presentation, as shown in FIG. 1. For example, in FIG. 1, additional services based on the available result or information about steps taken to render the result are provided on the right panel 104. The list of related functions in the right panel 104 includes function 120 for Edge Contrast, function 122 for Local Laplacian, function 124 for Gaussian Filter, function 126 for Histogram Equalization, function 130 for Find Circles, function 132 for Decorrelation Stretch, function 134 for Rotate Image, function 136 for Gray Scale, function 140 for Resize Image, function 142 for Warp Image, function 144 for Complement Image, function 146 for Size, function 150 for flip up-down, function 152 for flip left-right, function 154 for Add Noise, function 156 for Sum Columns, function 160 for Sharpen, function 162 for Image Histogram, function 164 for Histogram, function 166 for Adjust Image, and function 170 for Watershed transform. Additionally or alternatively, when available, information about steps taken to render the result is presented. In the example shown in FIG. 1, plot 172 shows the input 174 and output 176, illustrating steps taken (e.g., filtering steps) to generate the output 176 from the input 174. Such an illustration can help a user to understand the steps and determine whether the function(s) or code that implements such steps should be selected for processing data of interest. Once the user drag and drops or otherwise selects the desired function from the right panel 104, this list in the right panel 104 may be dynamically updated to show an updated list of related functions. The same process may repeat as the user continues to select different functions from the right panel 104. In some embodiments, right panel 104 shows none or only a portion of the results from the related functions. Instead, a user element such as a tooltip display may be used to display some or all of the results from the related functions to the user. For example, the user may hover a pointer or a cursor over a function, e.g., code 112, without clicking it, and a tooltip may appear, e.g., a small box, with one or more results from functions related to the function being hovered over. Additionally or alternatively, another suitable user element may be used to display some or all of the results from the related functions to the user.

Example Environment Arrangement

Figure 2:
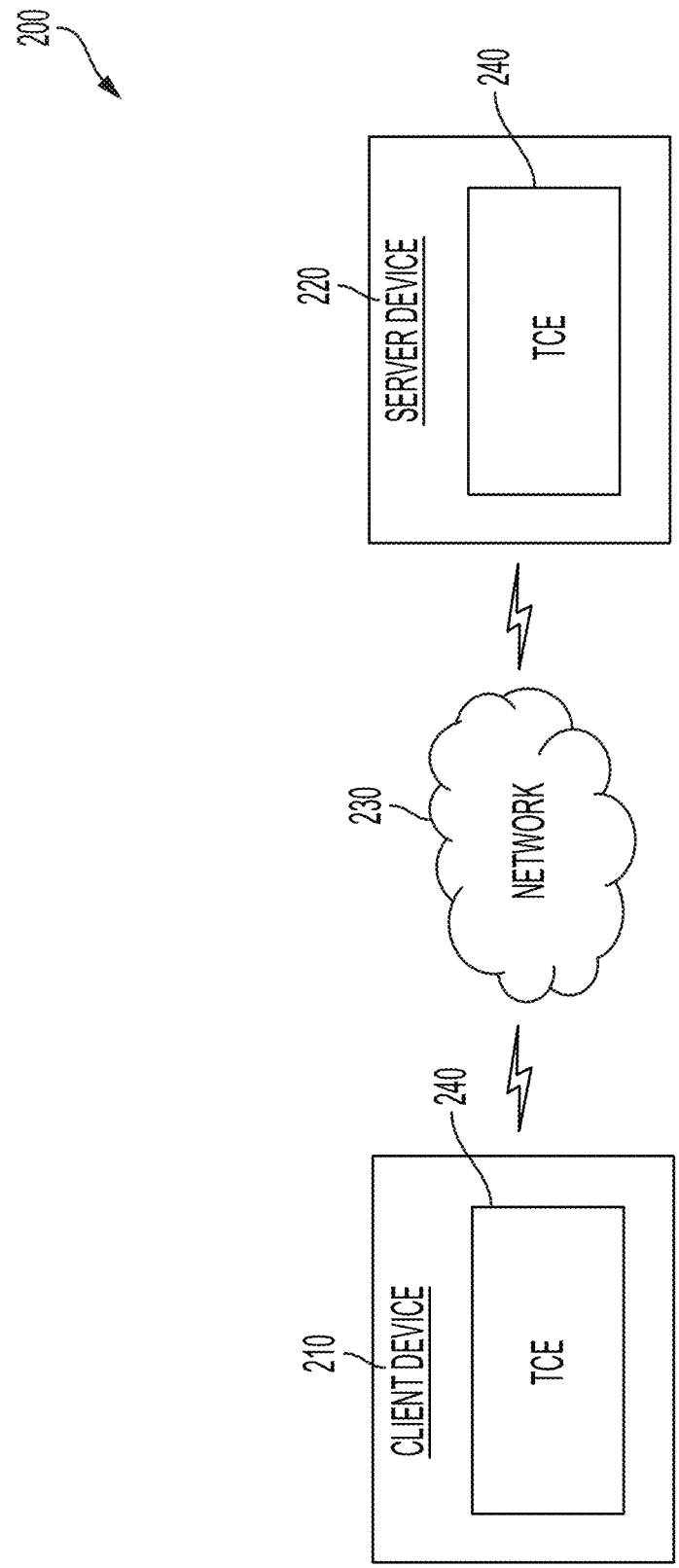
FIG. 2 depicts an exemplary environment in which systems and/or methods described herein may be implemented.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, evaluating, and/or providing program code and/or information associated with program code (e.g., a result of evaluating program code). For example, client device 210 may include a computing device, such as a desktop computer, a laptop computer, a tablet computer, a handheld computer, a server, a mobile phone (e.g., a smart phone, a radiotelephone, etc.), or a similar device. Client device 210 may evaluate program code by, for example, executing the program code, determining an error associated with the program code (e.g., by validating the program code, debugging the program code, etc.), determining information associated with the program code (e.g., determining help information associated with the program code), or the like. In some implementations, client device 210 may receive information from and/or transmit information to server device 230 (e.g., program code and/or information associated with program code).

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; SCADE Suite by Ansys; etc.), or another type of environment, such as a hybrid environment that may include, for example, a text-based environment and a graphically-based environment.

TCE 220 may include, for example, a user interface that provides a code editor portion that permits a user to input program code (e.g., textual program code, graphical program code, etc.). Additionally, or alternatively, TCE 220 may include a user interface that provides a code evaluation portion that provides results corresponding to program code displayed in the code editor portion. TCE 220 may provide one or more correspondence indicators that indicate a correspondence between different portions of program code and respective results associated with the different portions of program code. TCE 220 may permit a user to input one or more configuration parameters that may control, for example, a manner in which a result is displayed and/or provided, a manner in which program code is displayed and/or provided, a manner in which a correspondence indicator is displayed and/or provided, or the like.

Server device 230 may include one or more devices capable of receiving, generating, storing, evaluating, and/or providing program code and/or information associated with program code. For example, server device 230 may include a computing device, such as a server, a desktop computer, a laptop computer, a tablet computer, a handheld computer, a mobile device, or a similar device. In some implementations, server device 230 may include an embedded device, such as a microcontroller (e.g., an Arduino microcontroller, a device utilizing an ARM architecture, a device utilizing an x86 architecture, etc.). In some implementations, server device 230 may host TCE 220. In some implementations, client device 210 may be used to access one or more TCEs 220 running on one or more server devices 230. For example, multiple server devices 230 may be used to evaluate program code (e.g., serially or in parallel) and may provide respective results of evaluating the program code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution).

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Example Device Architecture

Figure 3:
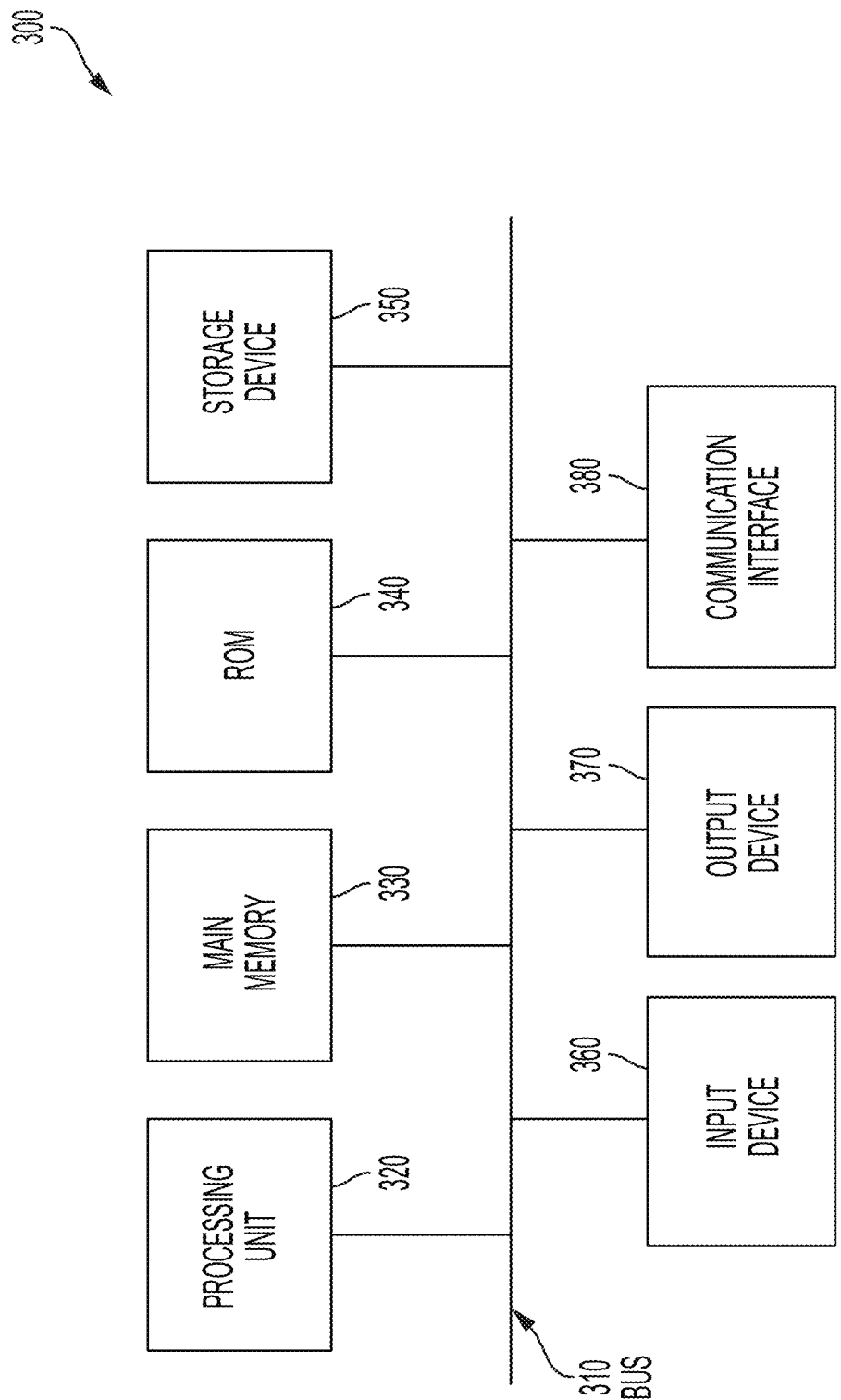
FIG. 3 depicts an exemplary schematic of one or more of the devices of the environment depicted in FIG. 2.

FIG. 3 is a diagram of example components of a device 300, which may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit, a graphics processing unit, an accelerated processing unit, etc.), a microprocessor, a microcontroller, and/or any processing component (e.g., a field-programmable gate array (FPGA), an application-specific integrated circuit (ASIC), an Arduino microcontroller, etc.) that interprets and/or executes instructions (e.g., according to an instruction set architecture, such as ARM, x86, etc.), and/or that is designed to implement one or more computing tasks. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform one or more processes described herein. Device 300 may perform these processes in response to processor 320 executing software instructions included in a computer-readable medium, such as memory 330 and/or storage component 340. A computer-readable medium may be defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Exemplary Method for Implementing Services for Assisting Programming

Figure 4:
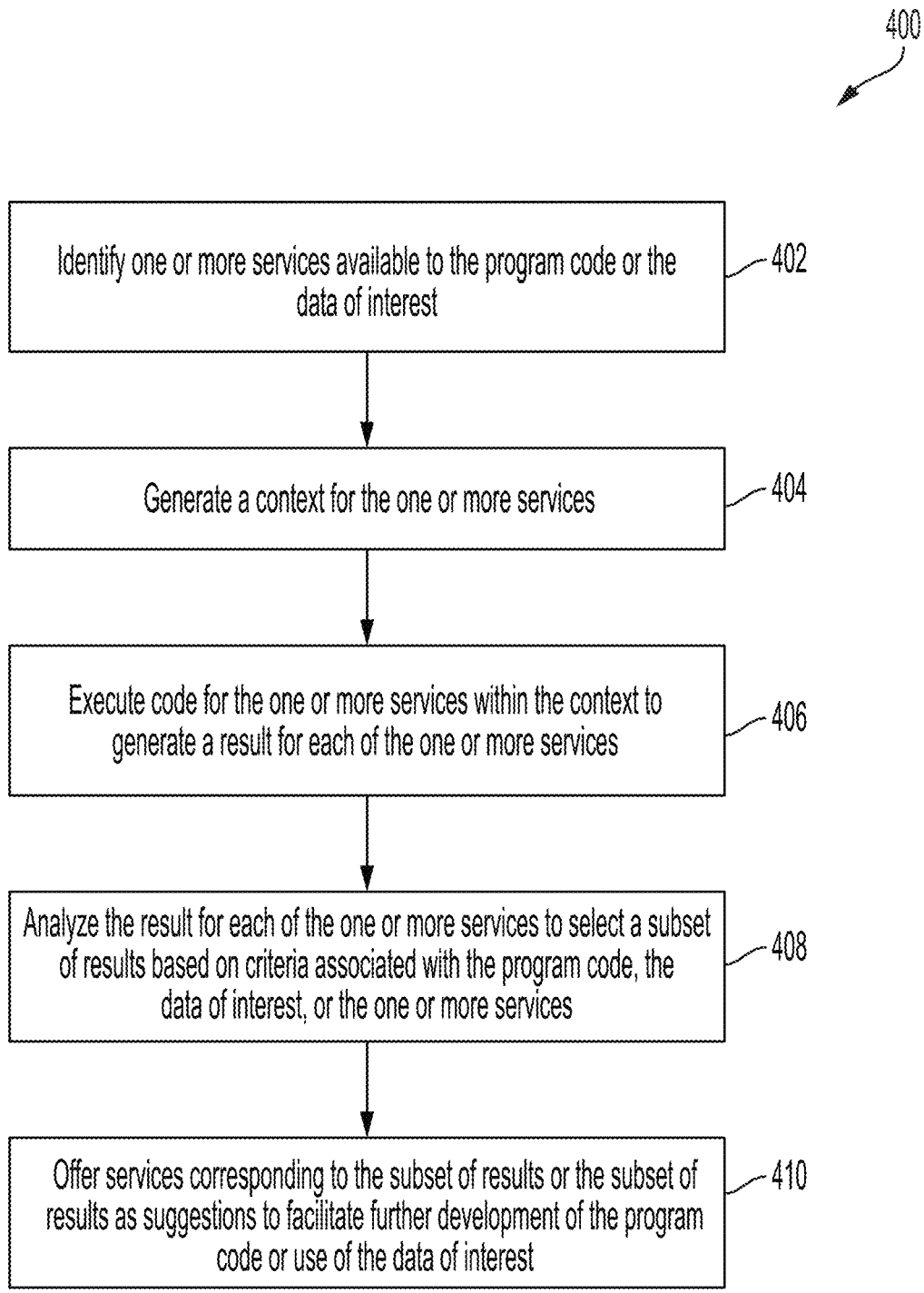
FIG. 4 depicts an exemplary method for implementing the systems and/or methods described herein.

FIG. 4 depicts an exemplary method 400 for implementing the systems and/or methods described herein. The system may execute this exemplary method on one or more processors in communication with memory to implement the services for assisting programming. The services implementation may provide a collection of services beyond the runtime execution of the function, which may be used to determine suggestions to make to the user.

At step 402, during edit time, for program code or data of interest, the system identifies one or more services available to the program code or the data of interest. Even though the services are selected and executed in the background, e.g., in a separate service context, this aspect of the system is considered to be during the edit time as the user does not intend to or explicitly take any intentional action to initiate code execution. Instead, most likely the user is still viewing code or inputting additional code in the editor or command window. Additionally or alternatively, the edit time may include the user interacting with other aspects of the programming environment, including workspaces, folders, apps, etc. The one or more services may be programmed by an author of the function or another user having knowledge of the function, or may be automatically generated, e.g., by a trained model. For example, these services may include the ability to estimate how likely the function is to be useful at a specific point in a program, determine if the inputs to the function are correct, select suitable parameters for the function, determine if the function accomplished something useful when executed on the current input data, display a representation of the function results that allows the user to understand what the function did, offer alternatives to the function that may work better, or another suitable service. In some embodiments, the one or more services may provide a trained model that consumes the data of interest and outputs information that can be used to generate one or more suggestions.

To identify the services, the system analyzes the program code or data of interest to identify service implementation code. For example, the system determines the types of data, sizes of data, dimensions of data, etc., to identify service implementation code, e.g., code that invokes suitable operations (e.g., function calls) on the data of interest. In the example shown in FIG. 1, the system identifies that the data imported into the program is image data. Based on the image data, service implementation code is identified, which calls related functions and executes the functions with the image data, filters results based on relevancy or usefulness, and presents a list of related functions. In another example, the program code includes a function prototype and the system can use the function name, function arguments, or other related features of the function prototype to identify service implementation code. Taking a particular example, for a function Foo, service implementation code may be identified through identifiers, e.g., names related to function Foo: e.g., including Foo_checkinputs for checking inputs to the function, Foo_displayoutput for displaying function output, and Foo_fixparameters for fixing function parameters. The function name strings "_checkinputs," "_displayoutput," and "_fixparameters" may be stored such that when the system detects user input "Foo(x)" in the code, the system can look for related service implementation code functions to select and execute. The function name strings may help the system determine when to execute these services and how to display the results. For example, Foo_checkinputs may be executed before the function is called, while Foo_displayoutput may be executed after the function is called. In some implementations, other than names, other identifiers or tagging mechanisms can be used for identifying service implementation code based on analysis of the user program code or user data of interest. For example, a data structure related to the function Foo may include tags for service implementation code. The associations between the services or service implementation code and functions can be made known to any author of the service implementation code such that the author can add service implementation code to existing user customized functions or new user customized functions, whether or not the author authored these user functions. For example, when the associations are based on names, the naming conventions can be made known. In some implementations, based on the analysis of the user code or user data of interest, the system may select a sub-set of the identified available services to reduce the resource usage/waste or speed up service provision. The selection can be based on user history of use of such services to select the sub-set of the identified available services. In some implementations, one of the services can be tab completion. For example, the service may suggest functions in an order of likelihood without executing the functions. The suggestions may be made based on analyzing the available data and program context (e.g., recently executed commands, available data, variables, etc.). For example, if a previous command returns an image, based on analyzing the available data and program context, the next suggested function can be an image processing function. In another example, in using a toolbox for a control system, e.g., for an automobile, when a transfer function is used, based on analyzing the available data and program context, the next suggested function can be a tuning function.

At step 404, the system generates a service context for each of the one or more services. The system may generate the service context by generating a thread for executing the service implementation code for the one or more services. This thread may be separate from another thread for editing of the user program code by the user, e.g., a thread for the editor or command window. The service context may include additional information necessary for executing the services, e.g., inputs to the service implementation code extracted from the program code, and other information needed to create the thread, e.g., thread priority, whether to execute in the background or foreground, and/or identifiers for any parent or child threads. For example, the input data may be obtained from the editor or command window/workspace of user program code, e.g., by executing previously entered user program code. In some embodiments, the service context includes necessary information, e.g., the function, function parameters, data or code of interest, execution dependencies (e.g., other code/functions called by this function), for analysis, e.g., execution of the function on a separate thread, to provide the services. An example of a programming environment in which data or other user program information is made available to the system or program code without user intervention or intentionally triggering program code execution is provided in U.S. Pat. No. 10,222,944, the entire content of which is enclosed by reference. Having the service implementation code in a separate thread may be beneficial to speed up the service execution, allow for no interruption to the user viewing or editing code in the editor, and/or allow for execution of many, even hundreds or thousands of possible services, at the same time.

At step 406, the system executes service implementation code for the one or more services within the respective service contexts to generate result(s) for each of the one or more services. In some implementations, each service is provided through executing its respective service implementation code within a service context on a thread separate from other services, service code, service contexts, and threads. The different services can be provided through parallel execution of the service implementation code. While the system may perform speculative work in parallel in the background on the user's behalf, execution of the code for the one or more services within the service context (e.g., the generated thread) happens during edit time and does not delay or interfere with editing of the program code by the user. Further, the code for the one or more services is executed without the user intentionally requesting execution of the code. In some implementations, the system collects all results from all service implementation code execution. However, in some situations, the system may apply constraints on the executions. For example, the constraints can include time constraints (e.g., when the execution time exceeds a predetermined threshold, stop execution), resource constraints (e.g., when the memory or other hardware usage of a thread exceeds a predetermined threshold, stop execution), etc.

At step 408, the system analyzes the result for each of the one or more services to select a subset of results based on criteria associated with the program code, the data of interest, or the one or more services. Example criteria can include criteria relating to noise reduction, color correction, image recognition, and/or data smoothing. In the example shown in FIG. 1, the image recognition criteria is used, among other criteria, and services and results for functions Edge Contrast, Local Laplacian, Find Circles, and Watershed transform, among other functions, are shown in the right panel. Image smoothing service, for example, although its corresponding service code is executed, is not displayed because the image data may be sufficiently smooth and not require any further smoothing. The services corresponding to the subset of results or the subset of results may be displayed graphically as one or more suggestions. The one or more suggestions displayed within the user interface element may include a graphical representation of a result of the function to allow the user to understand the potential results if one service is selected or applied to the user program code or user data of interest. Taking the example of FIG. 1, multiple functions that can operate on the input image may be executed, and the results may be filtered. Functions with results that satisfy the criteria associated with the program code, the data of interest, or the one or more services may be selected and only those functions may be included that provided relevant results, e.g., meeting or exceeding one or more thresholds relating to the criteria. Alternatively, the functions may be preselected (i.e., not all functions) and executed and results may be provided to the user.

At step 410, the system offers, to a user, services corresponding to the subset of results or the subset of results as suggestions to facilitate further development of the program code or use of the data of interest. The system may allow a user to select and include services or part of the service into user program code. For example, the user can perform the action of moving operations from the right panel to the left panel in FIG. 1 to select the desired function and the selected function result may be made available to the user. Once the user drag and drops or otherwise selects the desired function from the right panel, the list of related functions may be dynamically updated to show an updated list in the right panel. The system returns to step 402 in this case and the process continues as the user selects a different function from the right panel.

Exemplary Services for Assisting Programming and Related Schematics

Figure 5:
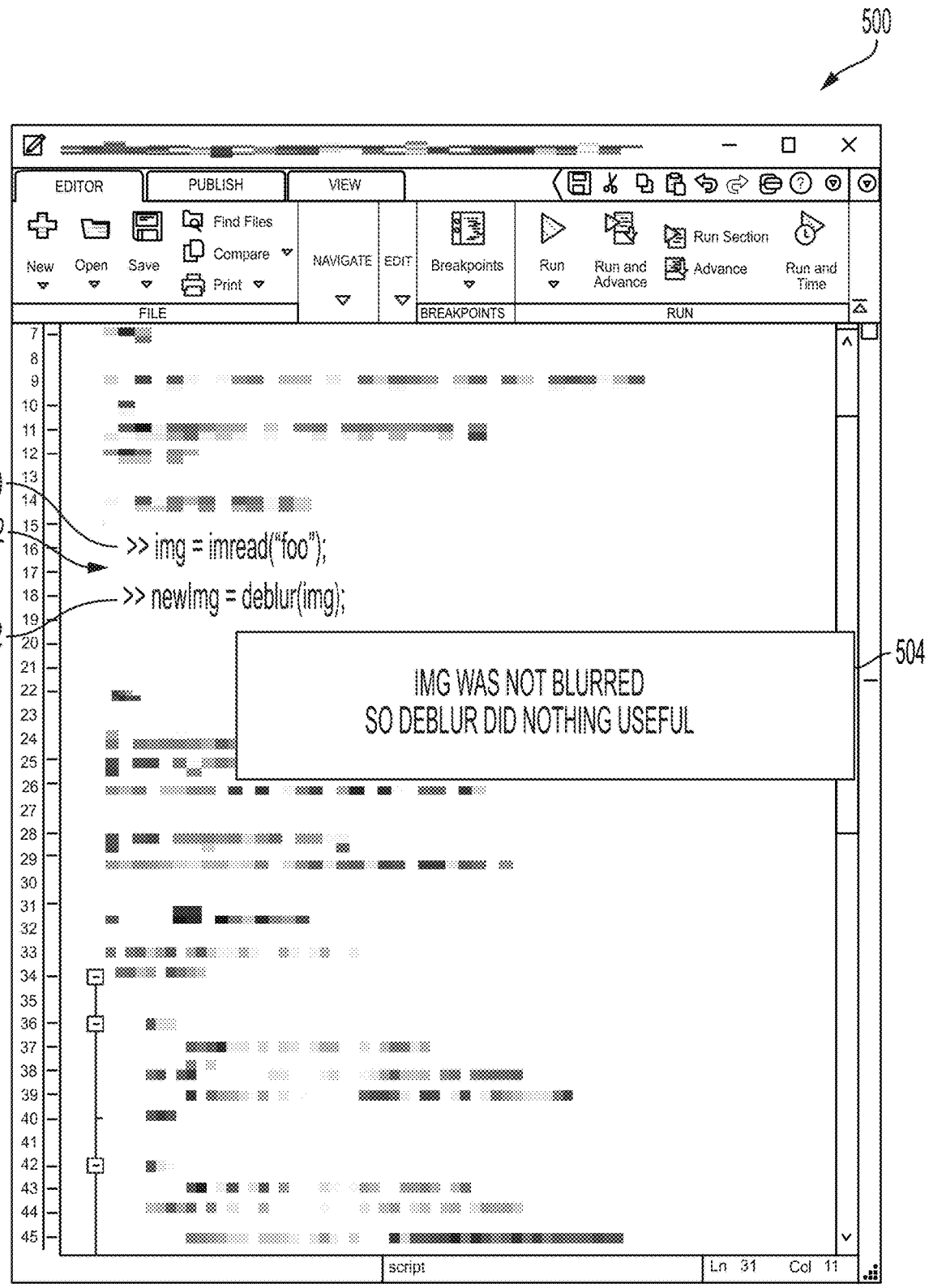
FIG. 5 depicts another exemplary interface for an editor with services for assisting programming.

FIG. 5 depicts an exemplary interface 500 for an editor with services for assisting programming. In this example, a service evaluates the usefulness of user program code of interest. When the user inputs program code 502, either manually or using the capability described with respect to FIG. 1, the system generates a separate service context for a service to evaluate usefulness of the user program code by executing the user program code (without user request/initiation) and determining whether the result of the user program code is intended by or helpful to the user or not. In this example, the user inputs program code 502 to read in and deblur an image, as shown below:

>>img=imread("foo");
>>newImg=deblur(img);

Image data from file "foo" is made available in the system after the first line of code 520 is executed. Upon execution of the second line of code 522, the system automatically starts service identification/provision process, e.g., as described in FIG. 4. In this particular example, the service evaluates usefulness of the program code line 522. The service implementation code executes the line of code with the available data, and the result is that the image is not deblurred because the image data was not blurred to begin with. To provide the service to the user, the system generates a message 504 for display by the editor or command window, indicating that the function did nothing useful as the image was not blurred to begin with, as shown below:

>>Img was not Blurred so Deblur Did Nothing Useful.

In some embodiments, this message and other suitable messages described herein may be presented textually or graphically within or outside the editor or command window or another suitable avenue to convey the message to the user. Message is a non-limiting example. Other graphical indicators, like highlighting, comment bubbles, or formatting can be used. In some implementations, the imported image data can be plotted and the service code execution can also be plotted, and the two plots can be shown to the user to illustrate that the deblur function did not affect the image data.

In some embodiments, if a result is found to be not useful, the user is optionally given the suggestion to remove the function from the program code 502. This usefulness evaluation may be the same as one criterion used in filtering services based on results in FIG. 1. For example, the system may assess usefulness of one or more related functions based on metrics such as noise reduction, color correction, image recognition, data smoothing, etc. For example, evaluating whether a result of the function is intended by the user or not may include determining whether the intended result includes one or more of noise reduction, color correction, image recognition, and/or data smoothing. In some situations, usefulness can be evaluated based on analyzing the user program code of interest. User intent can be derived from the analysis, e.g., noise reduction user code is to reduce noise in the user data. The result of the service implementation code execution can be analyzed, e.g., compared with previous user data, to determine whether an intended improvement/operation on the user data has been achieved, e.g., whether the result contains less noisy data than the previous user data.

Figure 6:
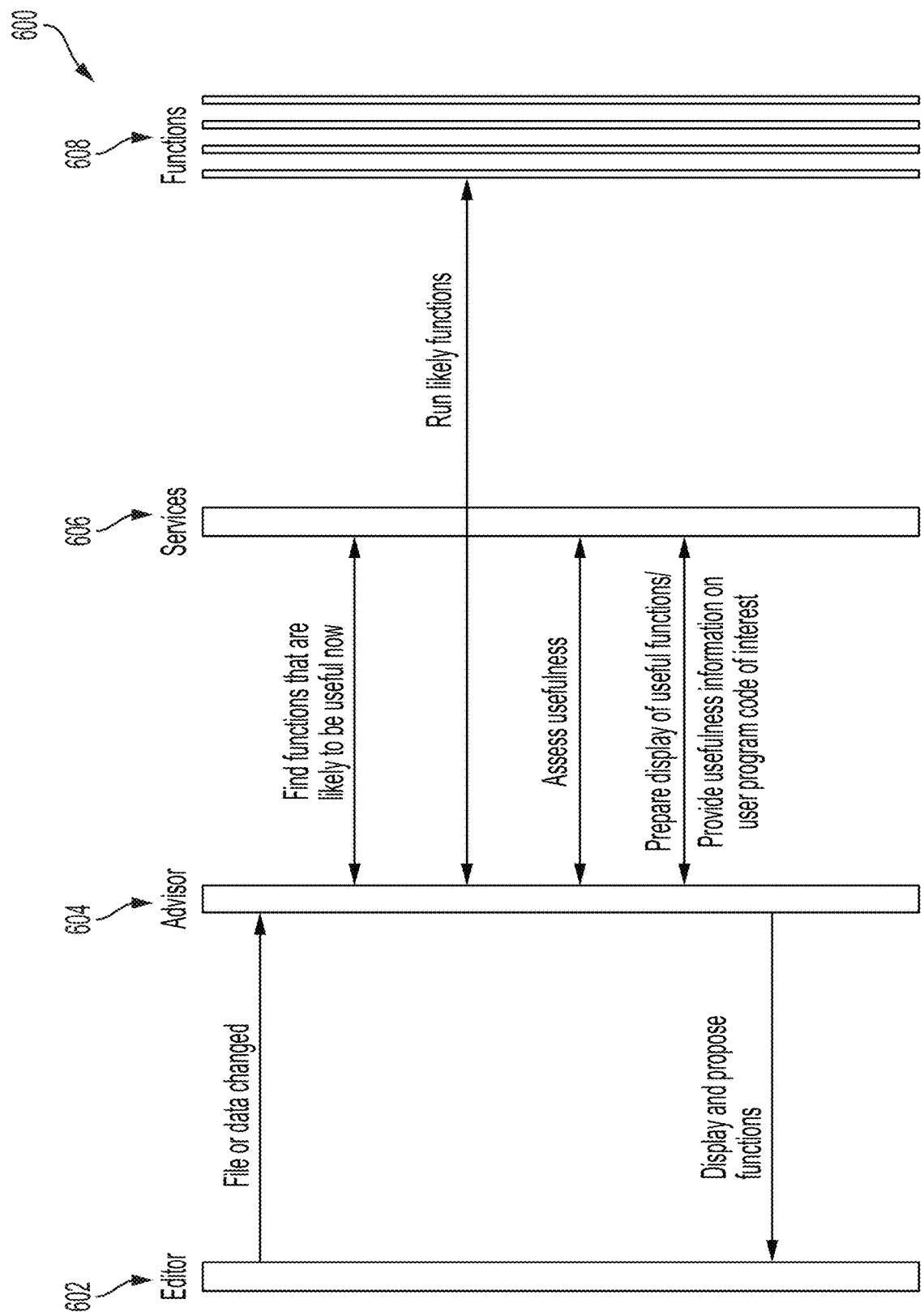
FIG. 6 depicts an exemplary schematic for implementing services for assisting programming described with respect to FIG. 1 and/or FIG. 5.

FIG. 6 depicts an exemplary schematic 600 for implementing the services for assisting programming described with respect to FIG. 1 and/or FIG. 5. The system that implements the methods of FIG. 4 and provides the capabilities of FIGS. 1 and 5 can include multiple software functionalities, including editor 602, advisor 604, services 606, and functions 608. One or more of these functionalities can be combined or further separated into sub-functionalities. The editor 602 can be the same as interface 100 of FIG. 1 for an editor with services for assisting programming or interface 500 of FIG. 5 for such an editor. Editor 602 may include the editor or command window or another suitable means for the user to input and/or edit program code. Advisor 604 can be part of the editor 602 or a separate part that communicates with the editor. In some implementations, the advisor can run simultaneously with the editor on the same thread or a different thread. Among other things, the advisor can perform service identification and/or service context generation functionalities, e.g., those corresponding to steps 402 and/or 404 of FIG. 4. The advisor may identify, select, and/or arrange to execute service implementation code 606 for one or more services. The service implementation code 606 may call other source program code (e.g., built-in functions in the system) or other user program code 608 (e.g., user defined/customized user functions) to provide services on suggesting potential next line or lines of user program code.

In one example, once the user inputs the user program code, e.g., program code 102, as shown in FIG. 1, the system may determine whether there is a usefulness service for a line of the user program code. Advisor 604 may execute the user program code without the user initiating execution (i.e., in the edit mode) to generate a result and then execute the service implementation code to determine usefulness. The service may analyze the workspace and recently called functions and determine if the user program code is likely to be useful in the current program context. Further, the service 606 may examine the result of the user program code and determine if the user program code did useful work, e.g., deblurred a blurry image. If the result is determined to be not useful based on a suitable evaluation standard, the service 606 may return a message accordingly for the user. Advisor 604 may relay that message to be displayed in Editor 602, e.g., message 504. If the result seems particularly useful, Advisor 604 may notify Editor 602 to alert the user as appropriate. The service 606 may create a display of the results that allows users to understand what the user program code did for them, e.g., as described with respect to FIGS. 13 and 14. Optionally, the editor or command window may propose candidate program source code that is relevant and useful, e.g., via the list of functions 106. Additionally or alternatively, the service 606 may be constructed to execute the user program code and evaluate the result so the editor or command window only need to execute the service, and not the user program code itself. Data is available for these candidate program source code or user program code 608 to execute with, and plots/graphical displays of such execution results are made available. In this situation, providing candidate is one service, but it can run multiple pieces of code 608, even hundreds or thousands pieces of code, in parallel. The filtering step can be done by service implementation code 606 or advisor 604 or a combination thereof.

In another example, once the user inputs the program code, e.g., program code 502, as shown in FIG. 5, Advisor 604 may execute the user program code without the user initiating execution (i.e., in the edit mode) to generate a result and then execute the service implementation code to determine usefulness. The service may analyze the workspace and recently called functions and determine if the user program code is likely to be useful in the current program context. Further, the service 606 may examine the result of the user program code and determine if the user program code did useful work, e.g., deblurred a blurry image. If the result is determined to be not useful based on an evaluation standard, the service 606 may return a message accordingly for the user. Advisor 604 may relay that message to be displayed in Editor 602, e.g., message 504. If the result seems particularly useful, Advisor 604 may notify Editor 602 to alert the user as appropriate.

Figure 7:
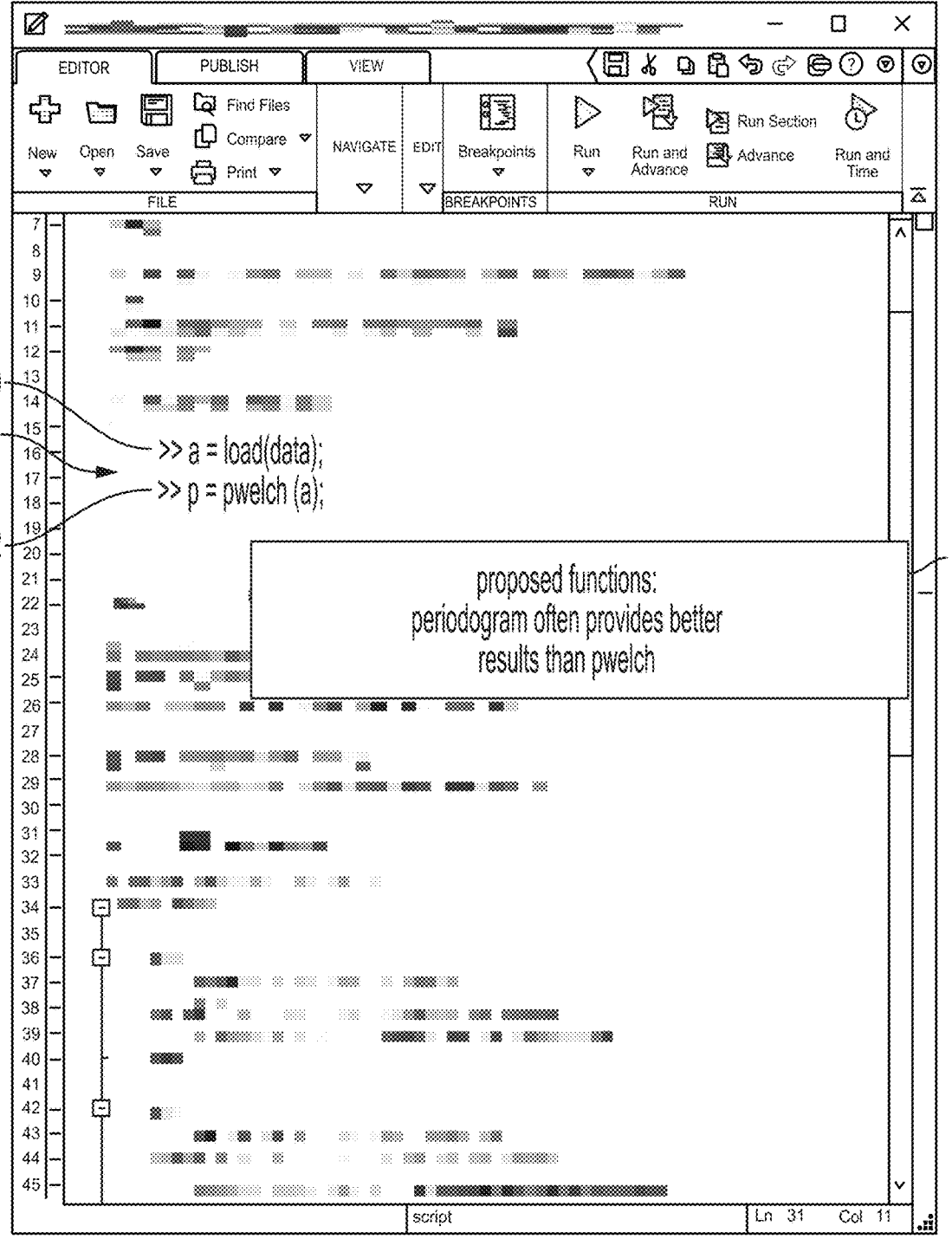
FIG. 7 depicts yet another exemplary interface for an editor with services for assisting programming.

FIG. 7 depicts an exemplary interface 700 for an editor with services for assisting programming. In this example, a service attempts to identify algorithmic or functional alternatives to the user program of interest. When the user inputs program code 702, the system generates a separate service context for a service to determine if there is better source program code to achieve the same result, given the current input data. The service is executed, and the results are displayed as part of a suggestion to replace the user program code with the candidate program source code.

In this example, the user inputs program code 702, as shown below:
>>a=load(data);
>>p=pwelch(a);

Input data from file "data" is made available in the system after the first line of code 720 is executed. Upon execution of the second line of code 722, the system automatically starts service identification/provision process, e.g., as described in FIG. 4. In this particular example, the service evaluates if there is a better source program code than program code line 722 to achieve the same result, given the current input data. The service implementation code executes the line of code with the available data, and the result is that the candidate program source code provides better results than the user program code. To provide the service to the user, the system generates a message 704 for display by the editor or command window, indicating that the candidate program source code may provide better results, as shown below:
>>periodogram often provides better results than pwelch In some embodiments, if there are multiple suggestions, the system may rank the suggestions and display them in the ranked order to the user, indicating that a higher ranked alternative function is a more suitable replacement for the function than another lower ranked alternative function. In some embodiments, user preferences or user information may be used as a factor to rank the suggestions for display to the user. For example, the user may have explicitly specified a preference for the field of control systems and/or previously used functions relating to the field of control systems. The system may rank the suggestions relating to the field of control systems higher than other suggestions for display to the user.

In some embodiments, this analysis may follow the determination with respect to FIG. 5 where the user program code generates results that are considered to be not useful. When the user program code is determined to generate results that are not useful, the system may suggest candidate program source code, as described above. In some embodiments, independent of whether the user program code generates useful results or not, if there is more effective candidate program source code, e.g., better performance or better results, the system may suggest the candidate program source code. Given the input data extracted from the user program code (i.e., intended functionality to be performed on the input data), the system may determine available candidate program source code to use by tentatively executing that code, although execution of that code is not necessary for generating a suggestion. For example, for a very large matrix, the system may suggest the typical candidate program source code that is most appropriate for inverting a very large matrix. In another example, the system may execute the candidate program source code first with the input data to figure out the most suitable alternatives before suggesting one or more candidates.

Figure 8:
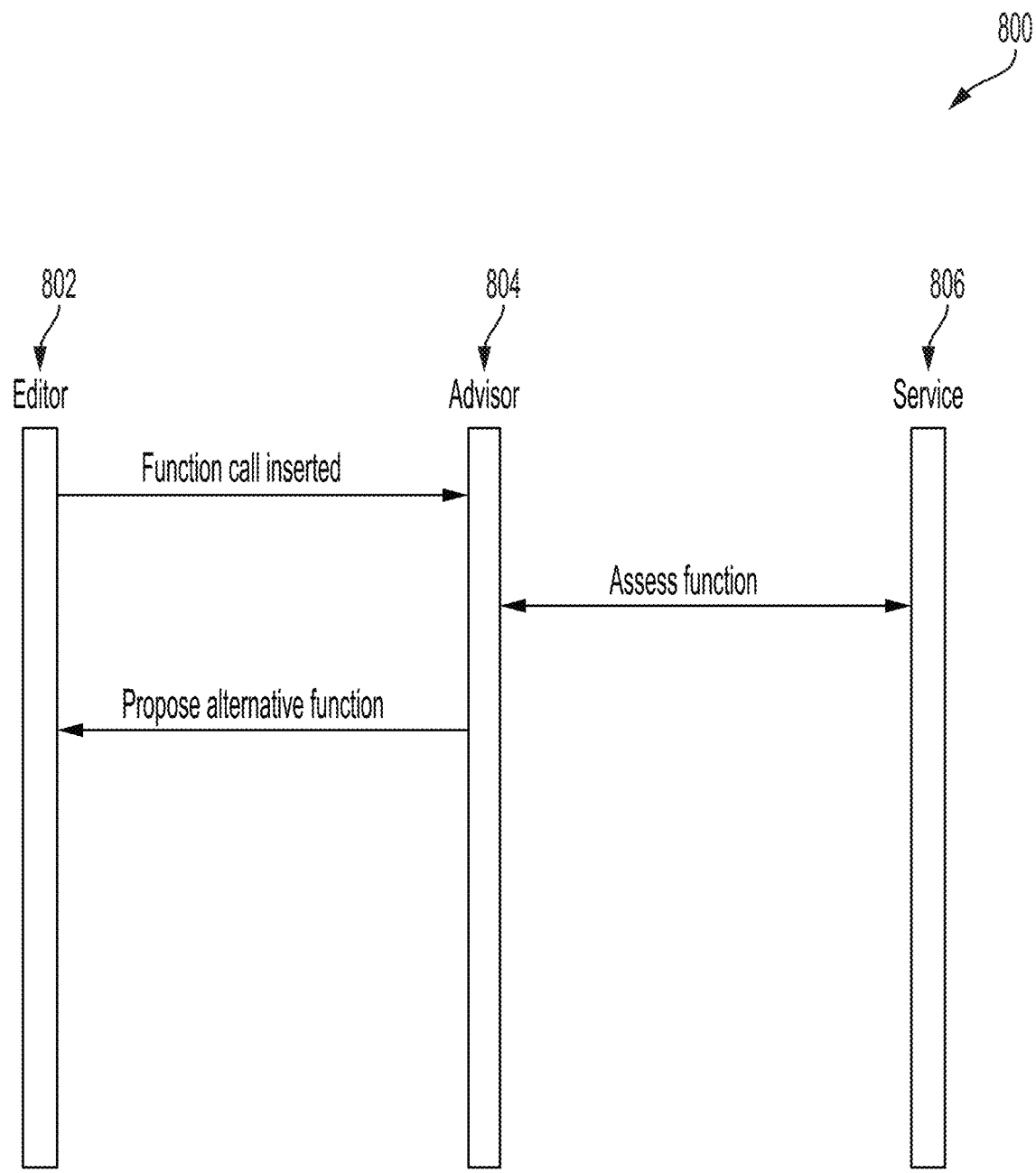
FIG. 8 depicts an exemplary schematic for implementing services for assisting programming described with respect to FIG. 7.

FIG. 8 depicts an exemplary schematic 800 for implementing the services for assisting programming described with respect to FIG. 7. The system that implements the methods of FIG. 4 and provides the capabilities of FIG. 7 can include multiple software functionalities, including editor 802, advisor 804, and services 806. One or more of these functionalities can be combined or further separated into sub-functionalities. The editor 802 can be the same as interface 700 of FIG. 7 for an editor with services for assisting programming. Editor 802 may include the editor or command window or another suitable means for the user to input and/or edit program code. Advisor 804 can be part of the editor 802 or a separate part that communicates with the editor. In some implementations, the advisor can run simultaneously with the editor on the same thread or a different thread. Among other things, the advisor can perform service identification and/or service context generation functionalities, e.g., those corresponding to steps 402 and/or 404 of FIG. 4. The advisor may identify, select, and/or arrange to execute service implementation code 806 for one or more services. The service implementation code 806 may call other source program code (e.g., built-in functions in the system) to provide services on suggesting potential next line or lines of user program code.

In this example, once the user inputs the user program code, e.g., program code 702, the system may generate a separate service context for the service 806 to determine if there is better candidate program source code to achieve the same result, given the current input data. Advisor 804 may execute the service 806 and display the results as part of a suggestion to replace the user program code with the candidate program source code. Advisor 804 may execute the service 806 without the user initiating execution (i.e., in the edit mode) of the service to identify algorithmic or functional alternatives to the user program code. Advisor 804 may relay that message to be displayed in Editor 802, e.g., message 704. The service 806 may create a display of the results that allows users to understand what the user program code did for them, e.g., as described with respect to FIGS. 13 and 14.

In some embodiments, the system may identify algorithmic or functional alternatives to at least a part of the user program code and suggest candidate program source code to replace or follow the user program code. The system may generate a prediction of a group of possible candidates based on statistical analysis of the user program code with respect to a corpus of prior program code having some or all included code annotated for analysis. The system may evaluate usefulness for each of the group of possible candidates based on speculative execution of the group of possible candidates, each applied to input data. Finally, the system may select candidate program source code based on the usefulness for each of the group of possible candidates. In some embodiments, the criteria for selecting candidate program source code that is expected to be called with output data produced by execution of the user program code or with the data of interest may include one or more usefulness criteria relating to noise reduction, color correction, image recognition, and/or data smoothing.

Figure 9:
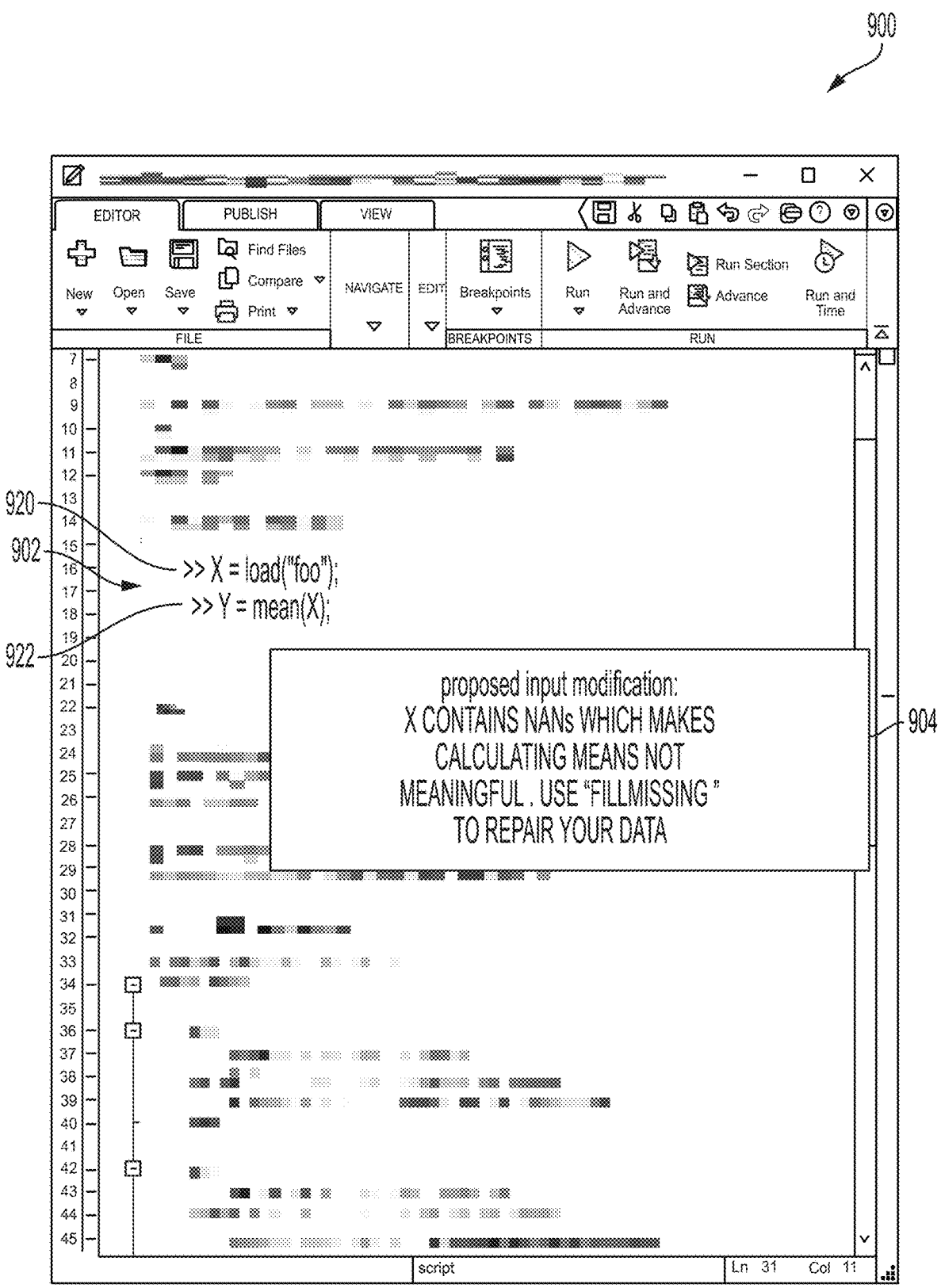
FIG. 9 depicts yet another exemplary interface for an editor with services for assisting programming.

FIG. 9 depicts an exemplary interface 900 for an editor with services for assisting programming. In this example, a service checks the inputs to the user program code for conformance to the requirements of the user program code. When the user inputs program code 902, the system generates a separate service context for a service to analyze inputs to the user program code for conformance to requirements of the user program code. The service is executed, and if there are any errors found, they are reported to the user along with an offer to fix the problem, if required and/or available.

In this example, the user inputs program code 902, as shown below:
>>X=load("foo");
>>Y=mean(X);

Data from file "foo" is made available to the system after the first line of code 920 is executed. Upon execution of the second line of code 922, the system automatically starts service identification/provision process, e.g., as described in FIG. 4. In this particular example, the service checks the inputs to the program code line 922 for conformance to the requirements of the user program code, given the current input data. The service implementation code executes the line of code with the available data, and the result is that the calculating mean is not meaningful because the data is not complete. To provide the service to the user, the system generates a message 904 for display by the editor or command window, indicating a possible solution to fix any potential problems with the input data, as shown below:
>>X Contains NANs which Makes Calculating Means not Meaningful. Use "Fillmissing" to Repair Your Data>

Figure 10:
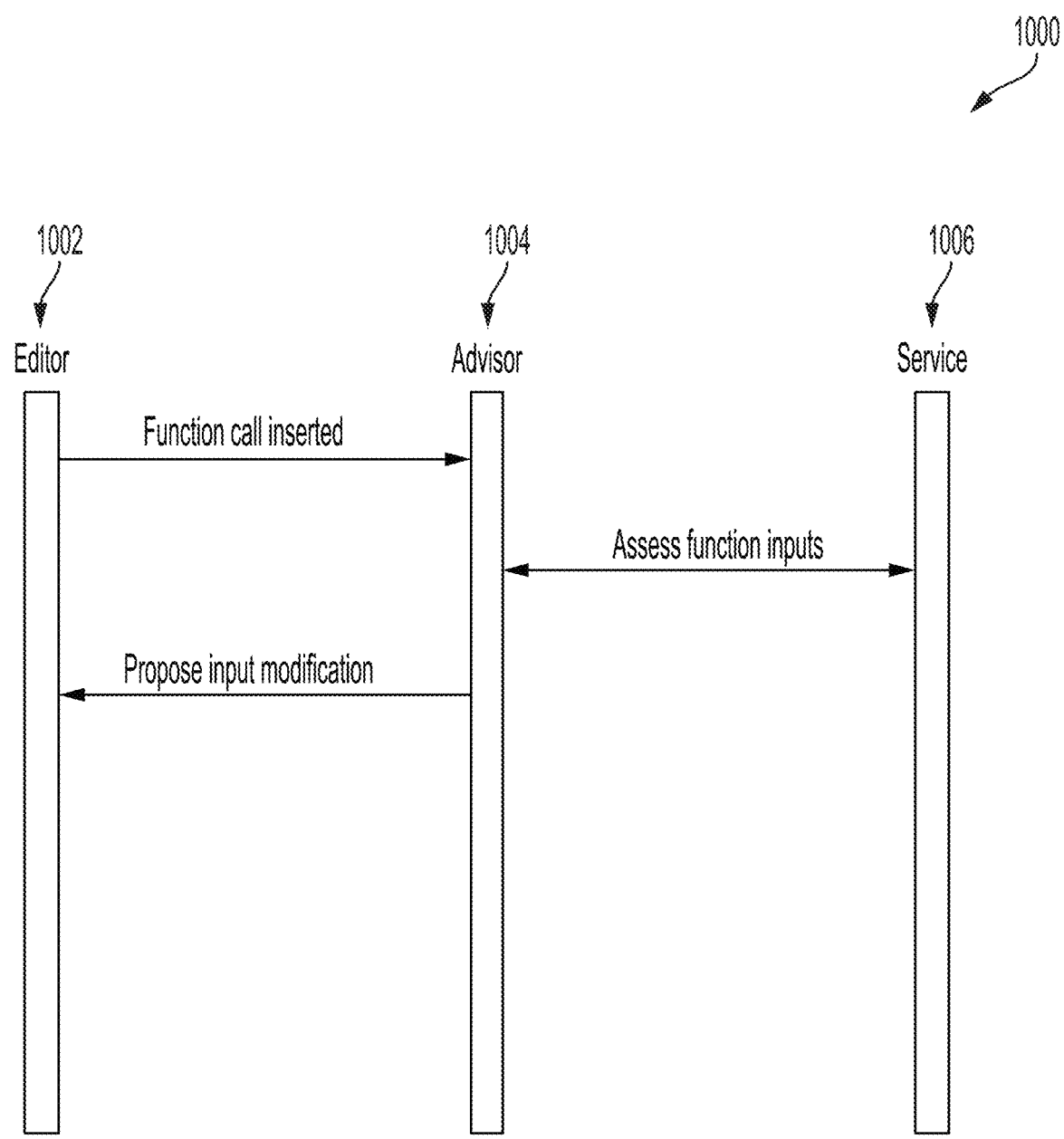
FIG. 10 depicts an exemplary schematic for implementing services for assisting programming described with respect to FIG. 9.

FIG. 10 depicts an exemplary schematic 1000 for implementing the services for assisting programming described with respect to FIG. 9. The system that implements the methods of FIG. 4 and provides the capabilities of FIG. 9 can include multiple software functionalities, including editor 1002, advisor 1004, and services 1006. One or more of these functionalities can be combined or further separated into sub-functionalities. The editor 1002 can be the same as interface 900 of FIG. 9 for an editor with services for assisting programming. Editor 1002 may include the editor or command window or another suitable means for the user to input and/or edit program code. Advisor 1004 can be part of the editor 1002 or a separate part that communicates with the editor. In some implementations, the advisor can run simultaneously with the editor on the same thread or a different thread. Among other things, the advisor can perform service identification and/or service context generation functionalities, e.g., those corresponding to steps 402 and/or 404 of FIG. 4. The advisor may identify, select, and/or arrange to execute service implementation code 1006 for one or more services. The service implementation code 1006 may call other source program code (e.g., built-in functions in the system) to provide services on suggesting potential next line or lines of user program code.

In this example, once the user inputs the user program code, e.g., program code 902, the system may generate a separate service context for the service 1006 to check the inputs to the user program code for conformance to the requirements of the user program code, given the current input data. Advisor 1004 may execute the service 1006 and display the results as part of a suggestion to fix any potential problems with the input data. Advisor 1004 may execute the service 1006 without the user initiating execution (i.e., in the edit mode) of the service to check the inputs to the user program code. Advisor 1004 may relay that message to be displayed in Editor 1002, e.g., message 904. The service 1006 may create a display of the results that allows users to understand what the function did for them, e.g., as described with respect to FIGS. 13 and 14.

In some embodiments, when generating the separate service context for the service 1006, the system extracts input data from the program code 902 as the input data needs to be made available for this evaluation. The service 1006 identifies one or more constraints on the inputs to the user program code. Based on the identified constraints, the service 1006 may determine whether any correction to the input data is required and whether there are any possible solutions that may be suggested to the user to resolve the potential problems with the input data. For example, the suggestions may indicate how to correct the input data (e.g., including process the input data using certain other functions) and/or what is wrong with the input data. In another example, the service 1006 may help validate and recommend helpful pre-processing on the input data. The service 1006 may examine input data to see if they are appropriate or suitable for the user program code. The service 1006 may determine correctness of the input data by imposing one or more requirements and/or constraints on the input data. For example, the service 1006 may determine whether input data is zeroed, whether the input data has one or more outliers, and/or whether an input image needs color correction. These requirements are sometimes explained in documentation relating to the user program code, but are often overlooked. Further, user program code typically omits these types of checks in service of performance. The service 1006 may be helpful to identify when inputs have such issues and generate offers to the user to help correct them.

Figure 11:
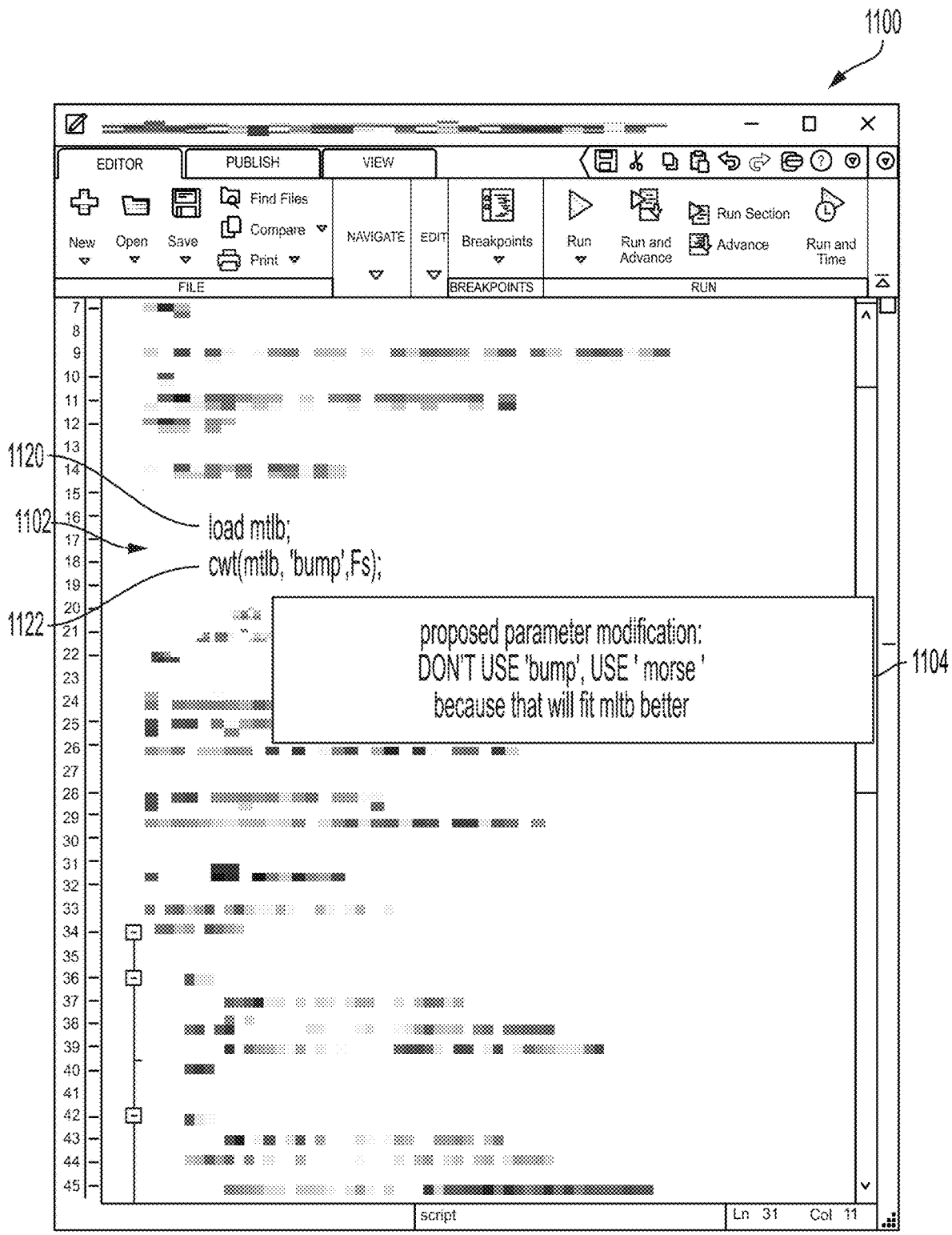
FIG. 11 depicts yet another exemplary interface for an editor with services for assisting programming.

FIG. 11 depicts an exemplary interface 1100 for an editor with services for assisting programming. In this example, a service attempts to optimize the parameters to the user program code, and if it can suggest a set of input parameters that are likely to produce a better result. When the user inputs program code 1102, the system generates a separate service context for a service to analyze parameters to the user program code. The service is executed, and if there are parameters found that can produce a better result, they may be reported to the user, optionally, with an offer to replace the parameters in the user program code.

In this example, the user inputs program code 1102, as shown below:

load mtlb;
cwt(mtlb,'bump',Fs);

Data from file "mtlb" is made available in the system after the first line of code 1120 is executed. Upon execution of the second line of code 1122, the system automatically starts service identification/provision process, e.g., as described in FIG. 4. In this particular example, the service checks the parameters of the program code line 1122. The service implementation code executes the line of code with the available data, and the result is that a better parameter is available for this data. To provide the service to the user, the system generates a message 1104 for display by the editor or command window, indicating parameters that were found to or may be likely to produce a better result for the user program code, as shown below:

>>>DON'T USE 'bump', USE 'morse' because that will fit mltb better

While FIGS. 9 and 10 relate to analyzing input data to determine whether it meets constraints for the user program code, in the example in FIG. 11, the system analyzes parameters that control how an algorithm for the user program code is run and can provide suggestions on more suitable parameters (or combinations of parameters) to improve the algorithm execution based on the input data. For example, replacing 'bump' with 'morse' for control parameters of the function 'cwt' may improve the algorithm execution of the user program code based on the input data.

In some embodiments, functions often have a number of parameters that the user must choose from. Making those choices may be tedious and require expertise that the user may not have. The service described above can instead automatically compute and access results for multiple values of parameters and select or allow the user to select the best combination of parameter values for the user program code.

For example, the service may use a relevant algorithm for certain tasks, like image processing, for reviewing whether certain parameters produce a result that is better. The system may display the better result to the user and offer the suggestion to use these parameters instead of the current parameters in the user program code.

Figure 12:
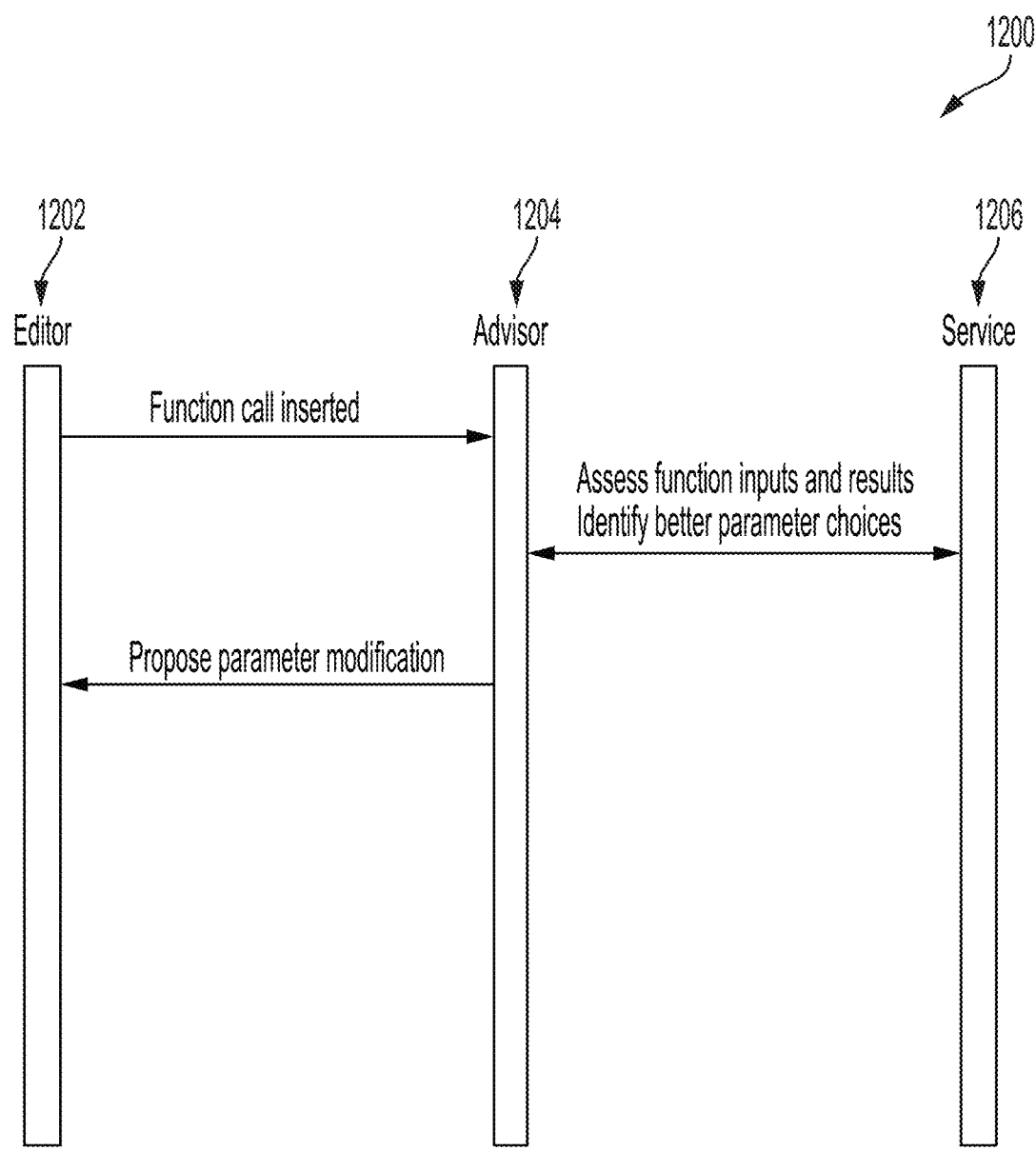
FIG. 12 depicts an exemplary schematic for implementing services for assisting programming described with respect to FIG. 11.

FIG. 12 depicts an exemplary schematic 1200 for implementing the services for assisting programming described with respect to FIG. 11. The system that implements the methods of FIG. 4 and provides the capabilities of FIG. 11 can include multiple software functionalities, including editor 1202, advisor 1204, and services 1206. One or more of these functionalities can be combined or further separated into sub-functionalities. The editor 1202 can be the same as interface 1100 of FIG. 11 for an editor with services for assisting programming. Editor 1202 may include the editor or command window or another suitable means for the user to input and/or edit program code. Advisor 1204 can be part of the editor 1202 or a separate part that communicates with the editor. In some implementations, the advisor can run simultaneously with the editor on the same thread or a different thread. Among other things, the advisor can perform service identification and/or service context generation functionalities, e.g., those corresponding to steps 402 and/or 404 of FIG. 4. The advisor may identify, select, and/or arrange to execute service implementation code 1206 for one or more services. The service implementation code 1206 may call other source program code (e.g., built-in functions in the system) to provide services on suggesting potential next line or lines of user program code.

In this example, once the user inputs the program code, e.g., program code 1102, the system may generate a separate service context for the service 1206 to check the parameters to the user program code, given the current input data. Advisor 1204 may execute the service 1206 and display suggestions on more suitable parameters (or combinations of parameters) to improve the algorithm execution for the user program code based on the input data. Advisor 1204 may execute the service 1206 without the user initiating execution (i.e., in the edit mode) of the service to check the parameters to the user program code. Advisor 1204 may relay that message to be displayed in Editor 1202, e.g., message 1104. The service 1206 may create a display of the results that allows users to understand what the function did for them, e.g., as described with respect to FIGS. 13 and 14.

In some embodiments, the service 1206 analyzes parameters associated with the user program code or the data of interest to identify adjustment for the parameters to produce a different result from executing the user program code or using the data of interest. The service 1206 may automatically compute results for multiple values of the parameters and select or allow the user to select a combination of values for the parameters to produce the different result. For example, the service 1206 may recommend parameter settings or choose values for function parameters that can be difficult or time consuming for an end user to determine without expert knowledge of the function. The service 1206 may assess the function parameters and results and propose parameter settings that improve the algorithm execution based on the current input data. For example, the service 1206 may recommend to: "Use a Morley wavelet instead of a bump for this data"; "Don't do an 11th order fit, you only have 11 data points"; or "rsm is a faster and more accurate for balanced data and your data is balanced."

Figure 13:
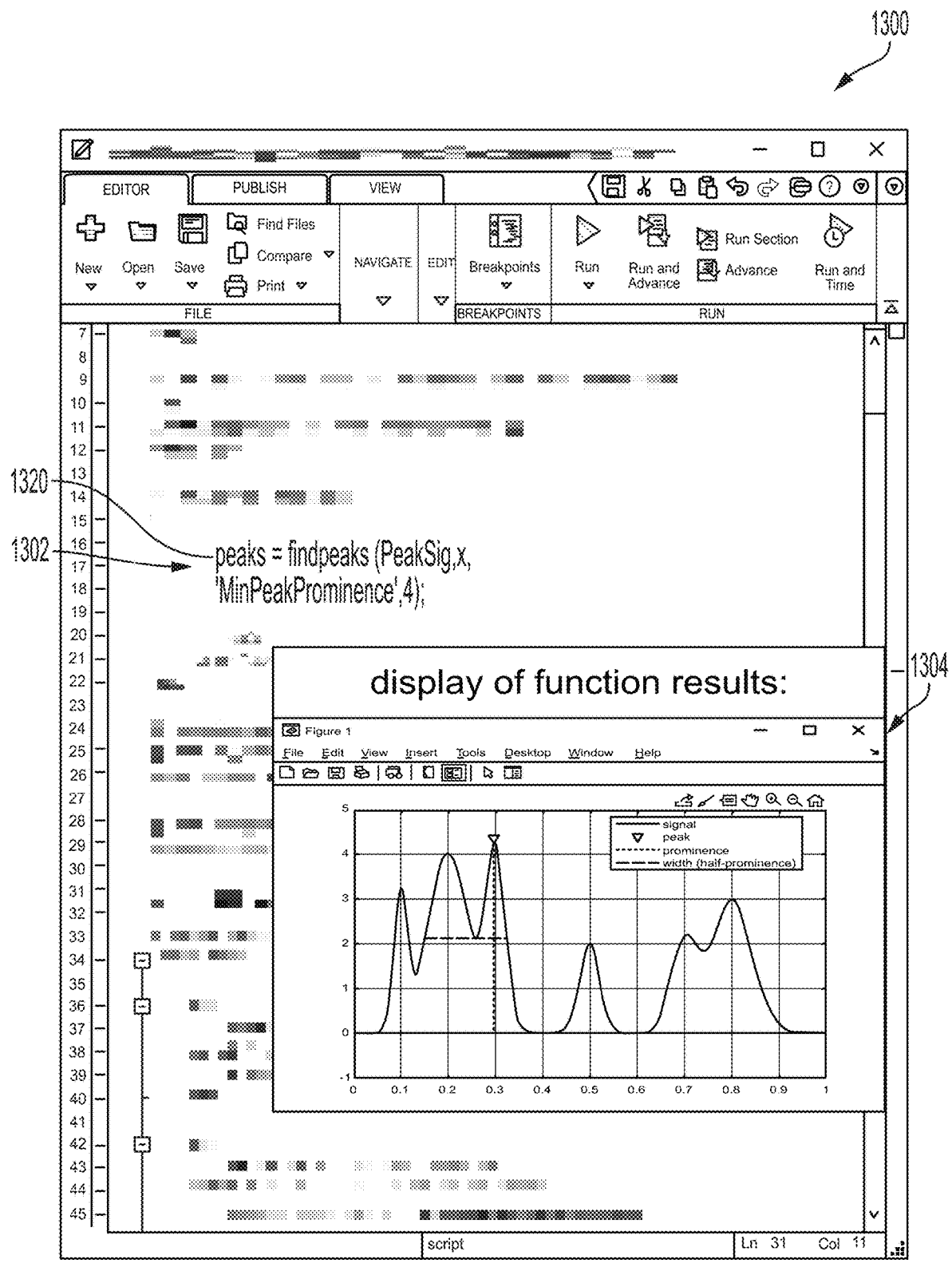
FIG. 13 depicts yet another exemplary interface for an editor with services for assisting programming.

FIG. 13 depicts an exemplary interface 1300 for an editor with services for assisting programming. In this example, a service automatically provides one or more figures for the user to understand the results of the user program code. When the user inputs program code 1302, the system generates a separate service context for a service to generate a FIG. 1304 illustrating the results of the user program code. The service is executed, and the FIG. 1304 of the results is generated for display to the user.

In this example, the user inputs program code 1302 including a function "findpeaks" in a dataset "PeakSig," as shown below:

peaks=findpeaks(PeakSig,x,'MinPeakProminence',4);

Upon execution of the line of code 1320, data from dataset "PeakSig" is made available in the system, and the system automatically starts service identification/provision process, e.g., as described in FIG. 4. In this particular example, even though no visualization is requested in the program code, the service provides the FIG. 1304 automatically so the user can understand the results of the user program code (e.g., in the FIG. 1304, the result from executing this program code will be only "0.3"). In different situations, different kinds of figures may be provided. Each figure for the user program code may provide meaningful results to the user in order to help the user understand and assess what the user program code has done for them.

In some embodiments, a service provides a visualization of functions suggested for user interaction. For example, once a user selects a suggested function from a service, in response another service may automatically generate a user interface element, e.g., a chiclet, for the function. The user can interact with the user interface element, e.g., to adjust the parameters of the function. A description for display and use of chiclet user interface elements is described in U.S. Pat. No. 8,365,082, which is incorporated herein by reference. In some embodiments, the service providing the user interface element may analyze the selected function, identify inputs and/or outputs to the selected function, and implement a visualization tool for displaying the inputs and/or outputs interactively to the user. Based on input from the user, the service may adjust one or more parameters of the selected function.

Figure 14:
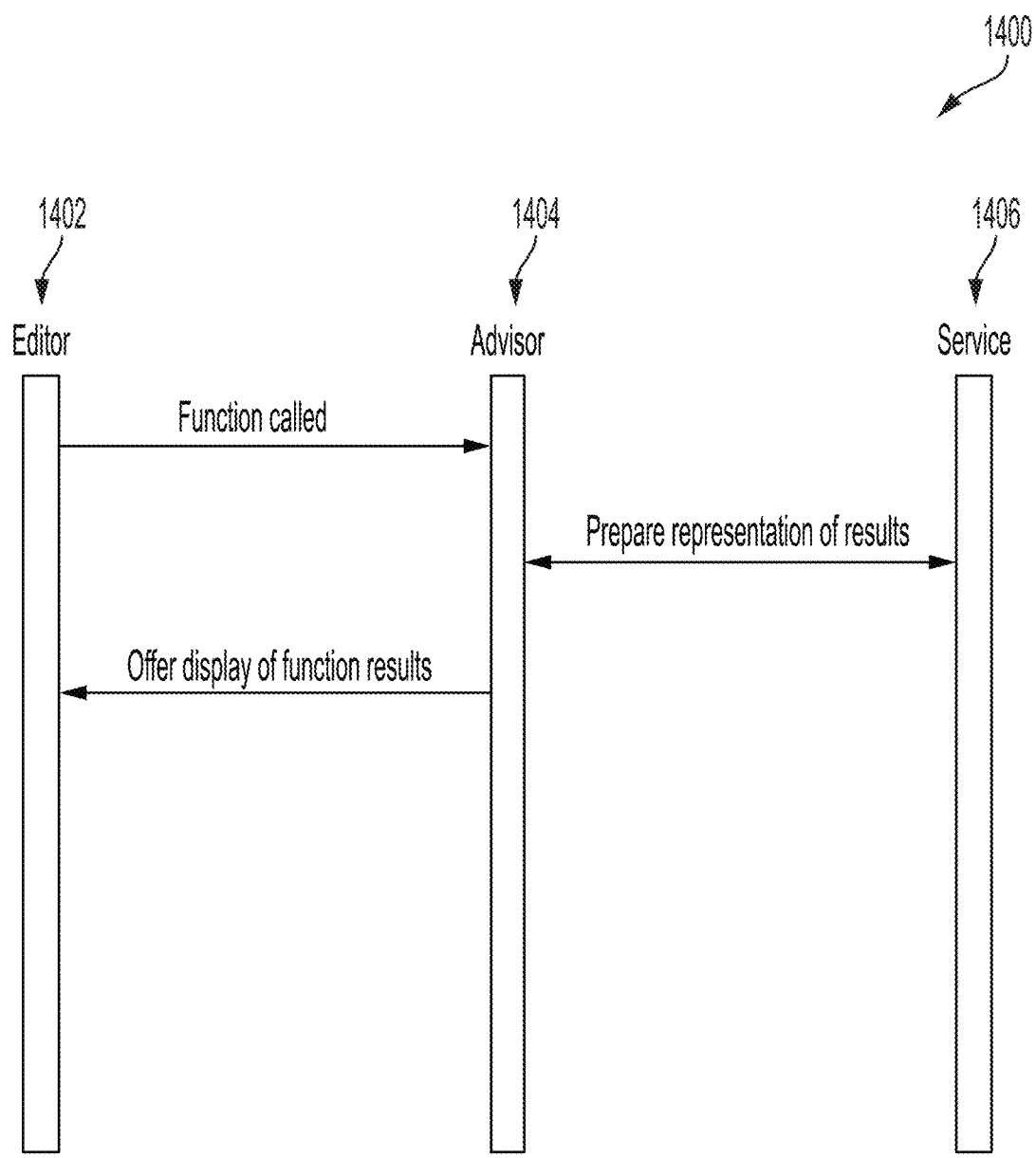
FIG. 14 depicts an exemplary schematic for implementing services for assisting programming described with respect to FIG. 13.

FIG. 14 depicts an exemplary schematic 1400 for implementing the services for assisting programming described with respect to FIG. 13. The system that implements the methods of FIG. 4 and provides the capabilities of FIG. 13 can include multiple software functionalities, including editor 1402, advisor 1404, and services 1406. One or more of these functionalities can be combined or further separated into sub-functionalities. The editor 1402 can be the same as interface 1300 of FIG. 13 for an editor with services for assisting programming. Editor 1402 may include the editor or command window or another suitable means for the user to input and/or edit program code. Advisor 1404 can be part of the editor 1402 or a separate part that communicates with the editor. In some implementations, the advisor can run simultaneously with the editor on the same thread or a different thread. Among other things, the advisor can perform service identification and/or service context generation functionalities, e.g., those corresponding to steps 402 and/or 404 of FIG. 4. The advisor may identify, select, and/or arrange to execute service implementation code 1406 for one or more services. The service implementation code 1406 may call other source program code (e.g., built-in functions in the system) to provide services on suggesting potential next line or lines of user program code.

In this example, once the user inputs the user program code, e.g., program code 1302, the system may generate a separate service context for the service 1406 to generate the FIG. 1304 illustrating the results of the user program code, given the current input data. Advisor 1404 may execute the service 1406 and display the FIG. 1304 automatically so the user can understand the results of the user program code based on the input data. Advisor 1404 may execute the service 1406 without the user initiating execution (i.e., in the edit mode) of the service to check the parameters to the user program code. Advisor 1404 may relay that information to be displayed in Editor 1402, e.g., FIG. 1304.

In some embodiments, it may be important that users are able to understand and assess what the user program code has done for them. The service 1406 may help users interpret results by generating effective, interpretable displays of the results. It may be more effective and/or efficient for such displays to be incorporated into the service 1406 and generated during edit time instead of being incorporated in runtime for the user program code, which may benefit from having less code and more efficient execution. The service 1406 may create a display of the results in combination with any combination of the service implementations described with respect to FIGS. 1 and 5-12, thereby allowing users to understand what the user program code did for them in any of these contexts.

CONCLUSION

Systems and/or methods described herein may be used to, during edit time, for program code or data of interest, identify one or more services available to the program code or the data of interest, generating a service context for the one or more services, execute code for the one or more services within the service context to generate a result for each of the one or more services, analyze the result for each of the one or more services to select a subset of results based on criteria associated with the program code, the data of interest, or the one or more services, and offer, to a user, services corresponding to the subset of results or the subset of results as suggestions to facilitate further development of the program code or use of the data of interest.

The one or more services may include executing a plurality of functions that are expected to be called with output data produced by execution of the program code or with the data of interest, analyzing results of the execution based on the criteria, and identifying results that satisfy the criteria, analyzing inputs to a function of the program code for conformance to requirements of the function, evaluating usefulness of a result to be generated by executing the program code or by using the data of interest, analyzing parameters associated with the program code or the data of interest to identify adjustment for the parameters to produce a different result from executing the program code or using the data of interest, and/or identifying algorithmic alternatives to at least a part of the program code.

In some aspects, the systems and/or methods described herein may be configured as described below:

(1) A method, comprising:
   during edit time, for program code or data of interest:
   identifying one or more services available to the program code or the data of interest;
   generating a context for the one or more services;
   executing code for the one or more services within the context to generate a result for each of the one or more services;
   analyzing the result for each of the one or more services to select a subset of results based on criteria associated with the program code, the data of interest, or the one or more services; and offering, to a user, services corresponding to the subset of results or the subset of results as suggestions to facilitate further development of the program code or use of the data of interest,
wherein the one or more services comprise one or more of:
executing a plurality of functions that are expected to be called with output data produced by execution of the program code or with the data of interest, analyzing results of the execution based on the criteria, and identifying results that satisfy the criteria,
analyzing inputs to a function of the program code for conformance to requirements of the function,
evaluating usefulness of a result to be generated by executing the program code or by using the data of interest,
analyzing parameters associated with the program code or the data of interest to identify adjustment for the parameters to produce a different result from executing the program code or using the data of interest, or
identifying algorithmic alternatives to at least a part of the program code.

(2) The method according to (1), wherein the services corresponding to the subset of results or the subset of results are displayed graphically as one or more suggestions.

(3) The method according to (2), wherein the one or more suggestions displayed within the user interface element comprises a graphical representation of a result of the function.

(4) The method according to (2), wherein the one or more suggestions displayed within the user interface element comprises a graphical representation of one or more steps taken to produce a result of the function.

(5) The method according to (1), wherein the code for the one or more services is executed within the context, during the edit time, without interfering with editing of the program code by the user and/or without the user requesting execution of the code.

(6) The method according to (1), wherein generating the context for the one or more services comprises generating a thread for executing the code for the one or more services, wherein the generated thread is separate from another thread for editing of the program code by the user.

(7) The method according to (1), wherein the one or more services provide a trained model that consumes the data of interest.

(8) The method according to (1), wherein evaluating usefulness of a result to be generated by executing the program code or by using the data of interest comprises evaluating usefulness of the function at its current position in the program code and/or when applied to input data.

(9) The method according to (8), wherein the usefulness of the function is determined by executing the function and evaluating whether a result of the function is intended by the user or not.

(10) The method according to (8), wherein correctness of the input data is determined by imposing one or more requirements and/or constraints on the inputs to the function.

(11) The method according to (1), wherein the criteria for executing the plurality of functions that are expected to be called with output data produced by execution of the program code or with the data of interest comprises one or more usefulness criteria relating to noise reduction, color correction, image recognition, and/or data smoothing.

(12) The method according to (1), wherein analyzing inputs to a function of the program code for conformance to requirements of the function comprises analyzing whether input data is zeroed, whether the input data has one or more outliers, and/or whether an input image needs color correction.

(13) The method according to (1), wherein evaluating usefulness of a result to be generated by executing the program code or by using the data of interest comprises executing the function and evaluating whether a result of the function is intended by the user or not, wherein the intended result includes one or more of noise reduction, color correction, image recognition, and/or data smoothing.

(14) The method according to (1), wherein analyzing parameters associated with the program code or the data of interest to identify adjustment for the parameters to produce a different result from executing the program code or using the data of interest comprises automatically computing results for multiple values of the parameters and selecting or allowing the user to select a combination of values for the parameters to produce the different result.

(15) The method according to (1), wherein identifying algorithmic alternatives to at least a part of the program code comprises a suggestion for another function to replace or follow the function, determined by:
predicting a group of possible functions based on statistical analysis of the program code with respect to a corpus of prior program code having some or all included functions annotated for analysis; and
evaluating usefulness for each of the group of possible functions based on speculative execution of the group of possible functions, each applied to input data; and selecting the another function based on the usefulness for each the group of possible functions.

(16) The method according to (1), wherein the data of interest includes a file or data that is added to or modified in a workplace or a folder of a programming environment relating to the program code or the data of interest.

(17) The method according to (1), wherein the one or more services are provided in response to a change in a workspace or a folder of a programming environment relating to the program code or the data of interest, or when the program code or data of interest is available or identified to be of interest.

(18) The method according to (1), wherein, in response to the user selecting a function suggested from the one or more services, generating a user interface element including parameters, inputs and/or outputs of the selected function for allowing the user to interactively adjust the parameters, the inputs, and/or the outputs of the selected function.

(19) A system, comprising:
at least one computer hardware processor; and
at least one non-transitory computer-readable storage medium storing processor-executable instructions that, when executed by the at least one computer hardware processor, cause the at least one computer hardware processor to perform the acts of:
during edit time, for program code or data of interest:
identifying one or more services available to the program code or the data of interest;
generating a context for the one or more services;
executing code for the one or more services within the context to generate a result for each of the one or more services;
analyzing the result for each of the one or more services to select a subset of results based on criteria associated with the program code, the data of interest, or the one or more services; and offering, to a user, services corresponding to the subset of results or the subset of results as suggestions to facilitate further development of the program code or use of the data of interest, wherein the one or more services comprise one or more of:

executing a plurality of functions that are expected to be called with output data produced by execution of the program code or with the data of interest, analyzing results of the execution based on the criteria, and identifying results that satisfy the criteria, analyzing inputs to a function of the program code for conformance to requirements of the function, evaluating usefulness of a result to be generated by executing the program code or by using the data of interest, analyzing parameters associated with the program code or the data of interest to identify adjustment for the parameters to produce a different result from executing the program code or using the data of interest, or identifying algorithmic alternatives to at least a part of the program code.

(20) At least one non-transitory computer-readable storage medium storing processor-executable instructions that, when executed by at least one computer hardware processor, cause the at least one computer hardware processor to perform the acts of:

during edit time, for program code or data of interest:

identifying one or more services available to the program code or the data of interest;

generating a context for the one or more services;

executing code for the one or more services within the context to generate a result for each of the one or more services;

analyzing the result for each of the one or more services to select a subset of results based on criteria associated with the program code, the data of interest, or the one or more services; and offering, to a user, services corresponding to the subset of results or the subset of results as suggestions to facilitate further development of the program code or use of the data of interest, wherein the one or more services comprise one or more of:

executing a plurality of functions that are expected to be called with output data produced by execution of the program code or with the data of interest, analyzing results of the execution based on the criteria, and identifying results that satisfy the criteria, analyzing inputs to a function of the program code for conformance to requirements of the function, evaluating usefulness of a result to be generated by executing the program code or by using the data of interest, analyzing parameters associated with the program code or the data of interest to identify adjustment for the parameters to produce a different result from executing the program code or using the data of interest, or identifying algorithmic alternatives to at least a part of the program code.

The foregoing description of implementations provides illustration and description, but is not intended to be exhaustive or to limit the implementations to the precise form disclosed. Modifications and variations are possible in light of the above teachings or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "module" that performs one or more functions. This module may include hardware, such as a processor, an ASIC, or a FPGA, or a combination of hardware and software.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

The invention claimed is:

1. A method, comprising:

during edit time, for program code or data of interest:

identifying, based on the program code or data of interest, one or more services available to the program code or the data of interest from a plurality of services;

generating a context for the one or more services;

executing, for the one or more services, associated implementation code that implements the one or more services, wherein the implementation code for the one or more services is executed within the context to generate an associated result for each of the one or more services;

analyzing the result for each of the one or more services to select a subset of results based on criteria associated with the program code, the data of interest, or the one or more services; and offering, to a user, the services corresponding to the subset of results or the subset of results as suggestions to facilitate further development of the program code or use of the data of interest, wherein the one or more services comprise one or more of:

executing, during edit time, a plurality of functions with output data produced by execution of the program code or with the data of interest, analyzing results of the execution based on the criteria, and identifying results that satisfy the criteria, wherein at least one of the plurality of functions may be called during a future runtime execution, analyzing, by executing a portion of the program code associated with a function of the program code during edit time, inputs to the function for conformance to requirements of the function, and detecting a problem with at least one of the inputs to the function based on the analysis of the inputs to the function for conformance to the requirements of the function, wherein:
  offering to the user the services corresponding to the subset of results or the subset of results comprises displaying a message indicating a possible solution that the user can make to the program code to fix the problem detected with the at least one of the inputs to the function, or
evaluating, during edit time, usefulness of a result to be generated by executing the program code or by using the data of interest to execute the program code to determine whether (a) the result is useful and the program code or data of interest can be maintained without removal, or (b) the result is not useful, wherein if the result is not useful:
  offering to the user the services corresponding to the subset of results or the subset of results comprises displaying a message indicating the program code or data of interest is not useful and should be considered for removal by the user.

2. The method of claim 1, wherein the services corresponding to the subset of results or the subset of results are displayed graphically as one or more suggestions.

3. The method of claim 2, wherein the one or more suggestions comprises a graphical representation of a result of the function.

4. The method of claim 2, wherein the one or more suggestions comprises a graphical representation of one or more steps taken to produce a result of the function.

5. The method of claim 1, wherein the code that implements the one or more services is executed within the context, during the edit time, without interfering with editing of the program code by the user and/or without the user requesting execution of the code.

6. The method of claim 1, wherein generating the context for the one or more services comprises generating a thread for executing the code that implements the one or more services, wherein the generated thread is separate from another thread for editing of the program code by the user.

7. The method of claim 1, wherein at least one of the plurality of functions uses a trained model that consumes the data of interest.

8. The method of claim 1, wherein evaluating usefulness of a result to be generated by executing the program code or by using the data of interest comprises evaluating usefulness of the function at its current position in the program code and/or when applied to input data.

9. The method of claim 8, wherein the usefulness of the function is determined by executing the function and evaluating whether a result of the function is intended by the user or not.

10. The method of claim 8, wherein correctness of the input data is determined by imposing one or more requirements and/or constraints on the inputs to the function.

11. The method of claim 1, wherein the criteria for executing the plurality of functions with output data produced by execution of the program code or with the data of interest comprises one or more usefulness criteria relating to noise reduction, color correction, image recognition, and/or data smoothing.

12. The method of claim 1, wherein analyzing inputs to the function of the program code for conformance to requirements of the function comprises analyzing whether input data is zeroed, whether the input data has one or more outliers, and/or whether an input image needs color correction.

13. The method of claim 1, wherein evaluating usefulness of a result to be generated by executing the program code or by using the data of interest to execute the program code comprises executing the function and evaluating whether a result of the function is intended by the user or not, wherein the intended result includes one or more of noise reduction, color correction, image recognition, and/or data smoothing.

14. The method of claim 1, wherein the one or more services further comprise analyzing parameters associated with the program code or the data of interest to identify adjustment for the parameters to produce a different result from executing the program code or using the data of interest, comprising automatically computing results for multiple values of the parameters and selecting or allowing the user to select a combination of values for the parameters to produce the different result.

15. The method of claim 1, wherein the one or more services further comprise identifying algorithmic alternatives to at least a part of the program code, comprising a suggestion for another function to replace or follow the function, determined by:
  predicting a group of possible functions based on statistical analysis of the program code with respect to a corpus of prior program code having some or all included functions annotated for analysis;
  evaluating usefulness for each of the group of possible functions based on speculative execution of the group of possible functions, each applied to input data; and
  selecting the another function based on the usefulness for each the group of possible functions.

16. The method of claim 1, wherein the data of interest includes a file or data that is added to or modified in a workplace or a folder of a programming environment relating to the program code or the data of interest.

17. The method of claim 1, wherein the one or more services are provided in response to a change in a workspace or a folder of a programming environment relating to the program code or the data of interest, or when the program code or data of interest is available or identified to be of interest.

18. The method of claim 1, wherein, in response to the user selecting a function suggested from the one or more services, generating a user interface element including parameters, inputs and/or outputs of the selected function for allowing the user to interactively adjust the parameters, the inputs, and/or the outputs of the selected function.

19. A system, comprising:
  at least one computer hardware processor; and
  at least one non-transitory computer-readable storage medium storing processor-executable instructions that, when executed by the at least one computer hardware processor, cause the at least one computer hardware processor to perform the acts of:
  during edit time, for program code or data of interest:
    identifying, based on the program code or data of interest, one or more services available to the program code or the data of interest from a plurality of services;
    generating a context for the one or more services;
    executing, for the one or more services, associated implementation code that implements the one or more services, wherein the implementation code for the one or more services is executed within the context to generate an associated result for each of the one or more services;

analyzing the result for each of the one or more services to select a subset of results based on criteria associated with the program code, the data of interest, or the one or more services; and offering, to a user, the services corresponding to the subset of results or the subset of results as suggestions to facilitate further development of the program code or use of the data of interest, wherein the one or more services comprise one or more of:

executing, during edit time, a plurality of functions with output data produced by execution of the program code or with the data of interest, analyzing results of the execution based on the criteria, and identifying results that satisfy the criteria, wherein at least one of the plurality of functions may be called during a future runtime execution, analyzing, by executing a portion of the program code associated with a function of the program code during edit time, inputs to the function of the program code for conformance to requirements of the function, and detecting a problem with at least one of the inputs to the function based on the analysis of the inputs to the function for conformance to the requirements of the function, wherein:

offering to the user the services corresponding to the subset of results or the subset of results comprises displaying a message indicating a possible solution that the user can make to the program code to fix the problem detected with the at least one of the inputs to the function, or evaluating, during edit time, usefulness of a result to be generated by executing the program code or by using the data of interest to execute the program code to determine whether (a) the result is useful and the program code or data of interest can be maintained without removal, or (b) the result is not useful, wherein if the result is not useful:

offering to the user the services corresponding to the subset of results or the subset of results comprises displaying a message indicating the program code or data of interest is not useful and should be considered for removal by the user.

20. At least one non-transitory computer-readable storage medium storing processor-executable instructions that, when executed by at least one computer hardware processor, cause the at least one computer hardware processor to perform the acts of:

during edit time, for program code or data of interest:

identifying, based on the program code or data of interest, one or more services available to the program code or the data of interest from a plurality of services;

generating a context for the one or more services;

executing, for the one or more services, associated implementation code that implements the one or more services, wherein the implementation code for the one or more services is executed within the context to generate an associated result for each of the one or more services;

analyzing the result for each of the one or more services to select a subset of results based on criteria associated with the program code, the data of interest, or the one or more services; and offering, to a user, the services corresponding to the subset of results or the subset of results as suggestions to facilitate further development of the program code or use of the data of interest, wherein the one or more services comprise one or more of:

executing, during edit time, a plurality of functions with output data produced by execution of the program code or with the data of interest, analyzing results of the execution based on the criteria, and identifying results that satisfy the criteria, wherein at least one of the plurality of functions may be called during a future runtime execution, analyzing, by executing a portion of the program code associated with a function of the program code during edit time, inputs to the function of the program code for conformance to requirements of the function, and detecting a problem with at least one of the inputs to the function based on the analysis of the inputs to the function for conformance to the requirements of the function, wherein:

offering to the user the services corresponding to the subset of results or the subset of results comprises displaying a message indicating a possible solution that the user can make to the program code to fix the problem detected with the at least one of the inputs to the function, or evaluating, during edit time, usefulness of a result to be generated by executing the program code or by using the data of interest to execute the program code to determine whether (a) the result is useful and the program code or data of interest can be maintained without removal, or (b) the result is not useful, wherein if the result is not useful:

offering to the user the services corresponding to the subset of results or the subset of results comprises displaying a message indicating the program code or data of interest is not useful and should be considered for removal by the user.

21. The at least one non-transitory computer-readable storage medium of claim 20, wherein generating the context for the one or more services comprises generating a thread for executing the code that implements the one or more services, wherein the generated thread is separate from another thread for editing of the program code by the user.

22. The at least one non-transitory computer-readable storage medium of claim 20, wherein at least one of the plurality of functions uses a trained model that consumes the data of interest.

23. The at least one non-transitory computer-readable storage medium of claim 20, wherein the criteria for executing the plurality of functions with output data produced by execution of the program code or with the data of interest comprises one or more usefulness criteria relating to noise reduction, color correction, image recognition, and/or data smoothing.

24. The at least one non-transitory computer-readable storage medium of claim 20, wherein analyzing inputs to the function of the program code for conformance to requirements of the function comprises analyzing whether input data is zeroed, whether the input data has one or more outliers, and/or whether an input image needs color correction.

25. The at least one non-transitory computer-readable storage medium of claim 20, wherein evaluating usefulness of a result to be generated by executing the program code or by using the data of interest to execute the program code comprises executing the function and evaluating whether a result of the function is intended by the user or not, wherein the intended result includes one or more of noise reduction, color correction, image recognition, and/or data smoothing.

26. The at least one non-transitory computer-readable storage medium of claim 20, wherein the one or more services further comprise analyzing parameters associated with the program code or the data of interest to identify adjustment for the parameters to produce a different result from executing the program code or using the data of interest, comprising automatically computing results for multiple values of the parameters and selecting or allowing the user to select a combination of values for the parameters to produce the different result.

27. The at least one non-transitory computer-readable storage medium of claim 20, wherein the one or more services further comprise identifying algorithmic alternatives to at least a part of the program code, comprising a suggestion for another function to replace or follow the function, determined by:

predicting a group of possible functions based on statistical analysis of the program code with respect to a corpus of prior program code having some or all included functions annotated for analysis;

evaluating usefulness for each of the group of possible functions based on speculative execution of the group of possible functions, each applied to input data; and selecting the another function based on the usefulness for each the group of possible functions.

* * * * *